United States Patent
Sano et al.

(10) Patent No.: US 8,362,138 B2
(45) Date of Patent: Jan. 29, 2013

(54) WATER-INSOLUBLE COLORANT DISPERSION AND PRODUCTION METHOD THEREOF, AND RECORDING LIQUID, PRINTED ARTICLE, IMAGE-FORMING METHOD AND IMAGE-FORMING APPARATUS USING THE SAME

(75) Inventors: Satoshi Sano, Kanagawa (JP); Ryo Saito, Kanagawa (JP); Yohei Ishiji, Fujinomiya (JP); Jun Matsumoto, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 232 days.

(21) Appl. No.: 12/695,881

(22) Filed: Jan. 28, 2010

(65) Prior Publication Data
US 2010/0189967 A1 Jul. 29, 2010

(30) Foreign Application Priority Data

Jan. 29, 2009 (JP) ................................. 2009-018657
May 28, 2009 (JP) ................................. 2009-129697

(51) Int. Cl.
C09D 11/10 (2006.01)
B32B 3/12 (2006.01)
B05D 5/00 (2006.01)
B05C 5/00 (2006.01)

(52) U.S. Cl. ........ 524/548; 523/160; 523/200; 523/205; 523/207; 523/210; 428/195.1; 427/256

(58) Field of Classification Search .................. 524/548; 523/200, 205
See application file for complete search history.

(56) References Cited

U.S. PATENT DOCUMENTS 6,652,634 B1 * 11/2003 Akers et al. ................. 106/31.13

FOREIGN PATENT DOCUMENTS

| EP | 0 763 378 A2 | 3/1997 |
|---|---|---|
| EP | 0 763 580 A2 | 3/1997 |
| EP | 1 739 141 A1 | 1/2007 |
| EP | 1 834 997 A1 | 9/2007 |
| EP | 2 110 416 A2 | 10/2009 |
| EP | 2 130 881 A1 | 12/2009 |
| JP | 2003-026972 A | 1/2003 |
| JP | 2003-113341 A | 4/2003 |
| JP | 2004-043776 A | 2/2004 |
| JP | 2006-192586 A | 7/2006 |
| JP | 2006-342316 A | 12/2006 |
| JP | 2007-119586 A | 5/2007 |
| WO | 2007/089859 A1 | 8/2007 |

OTHER PUBLICATIONS

Gijutsu-Joho Kyokai, (Technical Information Institute Co., Ltd.) Ed., "Saishin 'Ganryo-bunsan' Jitsumu Know-how Jireishu (Newest Pigment Dispersion' Practical Know-how and Examples)" published in Oct. 2005, pp. 208-211.
Hirotaka Iijima, et al., "A New Water-based Inkjet Ink for Plain Paper Printing" Konica Minolta Technology Report, 2007, pp. 21-26, vol. 4.

* cited by examiner

Primary Examiner — Vu A Nguyen
(74) Attorney, Agent, or Firm — Sughrue Mion, PLLC

(57) ABSTRACT

A dispersion of a water-insoluble colorant, having: fine particles of at least one kind of water-insoluble colorant dispersed in a water-containing medium; and a polymer compound or surfactant having a structural unit represented by formula (I):

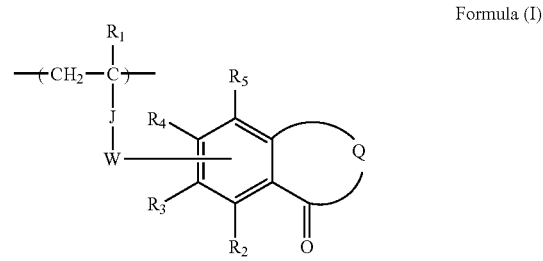

Formula (I)

wherein $R_1$ represents a hydrogen atom or a substituent; one of $R_2$ to $R_5$ represents a single bond which bonds to W, and the others each independently represent a hydrogen atom or a substituent; Q represents a group of atoms necessary for forming, with the carbon atoms, a ring; J represents —CO—, —COO—, —CONR$_6$—, —OCO—, a methylene group, a phenylene group, or —C$_6$H$_4$CO—; R$_6$ represents a hydrogen atom, an alkyl group, an aryl group or an aralkyl group; W represents a single bond or a divalent linking group.

18 Claims, No Drawings

WATER-INSOLUBLE COLORANT DISPERSION AND PRODUCTION METHOD THEREOF, AND RECORDING LIQUID, PRINTED ARTICLE, IMAGE-FORMING METHOD AND IMAGE-FORMING APPARATUS USING THE SAME

FIELD OF THE INVENTION

The present invention relates to a dispersion of a water-insoluble colorant and a production method of the dispersion, and a recording liquid, printed article (printed matter), image-forming method and image-forming apparatus using the dispersion.

BACKGROUND OF THE INVENTION

It is generally preferable that a dispersion is in a state where particles are stably dispersed and remain floating or suspended in liquid without aggregating together, and attaining a desired dispersion state is an important target of research and development in current industries. Adjustment and control of particle dispersion state is under study in various fields such as inorganic particles (e.g. magnetic materials), cosmetics, pigments, and foods. If a desired dispersion state is stabilized and, for example, the stabilized dispersion state is preserved even when the concentration is raised, improved efficiency and productivity of production processes can be attained by using a concentrated solution without performance deterioration. Further, in the field of coloring, colorants which can give deeply-, uniformly-, and brilliantly-colored dyed products can be manufactured, and such colorants will have increased commercial values. Properties of particles are generally better when the particle diameter is smaller, and there is a strong demand for stable dispersions containing particles having a diameter of sub-microns or of nanometers.

According to an inkjet recording method, high speed recording can be performed with a high freedom degree of imaging pattern and a low noise at the time of recording. Further, image recording can be performed in a short period of time and at low costs. Still further, the inkjet recording method has advantages such that color recording can be readily performed. Therefore, recently the inkjet recording method is rapidly spreading and further developing. As a recording liquid for the method, hitherto a dye ink, in which a water-soluble dye is dissolved in an aqueous medium, has been widely used. However, the dye ink is poor in water resistance and weather resistance of the resultant printed article. Therefore, studies of the dye ink have been made to improve such disadvantages.

A pigment ink is ordinarily obtained by dispersing a water-insoluble pigment in an aqueous medium. Hitherto, it is general to use a method which includes, adding a pigment together with one or plurality of dispersing agents such as various kinds of surfactants or water-soluble polymers to an aqueous solvent, and pulverizing them using a dispersing device such as a sand mill, a bead mill, or a ball mill, to make the diameter of the pigment particle fine. In contrast, dispersions formed by the build-up method of generating pigments and the like in liquid phase are also under development. For example, a method for preparing a pigment dispersion liquid by dissolving an organic pigment together with a polymer dispersant or a polymer compound as a dispersant in an aprotic organic solvent in the presence of alkali, and then mixing the resultant solution with water, is disclosed (see JP-A-2004-43776 ("JP-A" means unexamined published Japanese patent application)). In addition, polymer compounds and the like for use in the build-up method are studied (see JP-A-2003-26972, JP-A-2003-113341, JP-A-2006-342316, and JP-A-2007-119586), and dispersion stability of particles is also reviewed (see e.g., Gijutsu-joho Kyokai (Technical Information Institute Co., Ltd.) Ed., "Saishin 'Ganryo-bunsan' Jitsumu Know-how·Jireishu (Newest 'Pigment Dispersion', Practical Know-how and Examples)" published in October 2005, pp. 208-211). However, the dispersion stability is not still satisfactory, and there is a need for a further improving development.

In aqueous inkjet-ink printing, such a phenomenon is known that printing of a figure requiring a large amount of ink such as full-color photograph causes curling of the paper after ink ejection, and there is a demand for prevention of curling. The reason for curling is considered because hydrogen bonds of cellulose, a component of a paper which serves as the support, are cleaved by penetration of the ink solvent into the paper and then re-bind in random states when dried. As a method for preventing curling of paper, a method of adding a hydrophobic organic solvent having a large Log P value to the ink is proposed (see Hirotaka Iijima, Kenichi Okubo, and Kunitsuna Sasaki, "Konica Minolta Technology Report" Vol. 4 (2007) and JP-A-2006-192586).

SUMMARY OF THE INVENTION

As described above, certainly, use of a hydrophobic organic solvent in aqueous inks may produce improvement on reduction of paper curling. However, studies by the inventors has shown that simple addition of a hydrophobic organic solvent to ink leads to significant deterioration in stability of the viscosity of ink and the particle diameter of the colorant particles over time. The present invention solves such the problems unique to the aqueous ink.

Specifically, the present invention provides a water-insoluble-colorant dispersion, which contains water-insoluble colorant fine particles with extremely small primary particles, has high dispersion stability, and has high storage stability and thus can be stored for an extended period of time while keeping the desired properties; and a method of effectively producing the water-insoluble colorant dispersion. The water-insoluble colorant dispersion having the above-described excellent properties is suitable as a material for preparation of the aqueous inks containing a hydrophobic organic solvent. Further, the present invention also provides, by using the dispersion, a recording liquid which is improved with the prevention of the paper curling and has high dispersion stability, high light resistance, high transparency, and high ejection stability. The present invention further provides an image-forming method, and an image-forming apparatus using the same.

After intensive studies to solve the problems above, the inventors have found that, among additives for ultraviolet-curing inks disclosed in JP-A-2007-9117, compounds represented by the following formula (I), specifically polymer compounds having a substituent of an anthraquinone structure, are extremely effective as a dispersant in the dispersion for preparation of the aqueous ink containing a hydrophobic organic solvent described above. It is noted that, in the working examples of JP-A-2007-9117, the compounds represented by the following formula (I) were not used. The inventors have further found that, with the compound, it is possible to overcome the particular problem of lack of dispersion stability and to provide an ink excellent in various properties. The present invention has been made based on the findings above.

The present invention resides in a dispersion of a water-insoluble colorant, comprising: fine particles of at least one kind of water-insoluble colorant dispersed in a water-containing medium; and a polymer compound or surfactant having a structural unit represented by formula (I):

Formula (I)

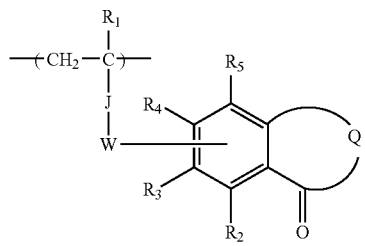

wherein $R_1$ represents a hydrogen atom or a substituent; one of $R_2$ to $R_5$ represents a single bond which bonds to W, and the others each independently represent a hydrogen atom or a substituent; Q represents a group of atoms necessary for forming, with the carbon atoms, a ring; J represents —CO—, —COO—, —CONR$_6$—, —OCO—, a methylene group, a phenylene group, or —C$_6$H$_4$CO—; $R_6$ represents a hydrogen atom, an alkyl group, an aryl group or an aralkyl group; W represents a single bond or a divalent linking group.

The present invention also resides in a method of producing the water-insoluble colorant dispersion, comprising the steps of: dissolving the water-insoluble colorant, the polymer compound or surfactant, and a base, into an aprotic water-soluble organic solvent; bringing the resultant solution into contact with an aqueous medium; and thus forming the fine particles of the water-insoluble colorant dispersed in the water-containing medium.

The present invention also resides in a recording liquid comprising the fine particles of the water-insoluble colorant dispersion, wherein the fine particles of the water-insoluble colorant is contained in an amount of 0.1 to 20% by mass with respect to a total mass of the recording liquid.

The present invention further resides in a printed article which contains the fine particles of the water-insoluble colorant, the printed article formed by the recording liquid, using a provider, wherein the provider has a function to adjust an applied amount or concentration of the recording liquid, thereby light-to-dark contrast of the printed article is adjusted.

The present invention also resides in an image-forming method, which comprises the steps of: providing a material, the recording liquid as described above, and an image-forming apparatus; and recording an image of the recording liquid on the material with the image-forming apparatus.

The present invention also resides in an image-forming apparatus, comprising:
a storage unit of the recording liquid; and an image-forming unit;
whereby the recording liquid is recorded on a material with the image-forming unit.

The dispersion according to the present invention contains fine particles of a water-insoluble colorant made fine to a level of nanometer sizes and has favorable dispersion stability over time so as to have very favorable storage stability. Therefore, the dispersion can be stored for an extended period of time without deterioration in desired properties. In addition, the dispersion according to the present invention is particularly suited as a material for preparation of inks containing a hydrophobic organic solvent and effective in controlling the problem of paper curling after ink ejection specific to such inks, and has an excellent operational advantage that it is possible to overcome the problems and assure preservation of high dispersion stability. Further, the recording liquid containing the dispersion according to the present invention is excellent in transparency, light resistance, and ejection efficiency, and can be applied to high-performance printed articles, image-forming methods, and image-forming apparatuses.

Other and further features and advantages of the invention will appear more fully from the following description.

DETAILED DESCRIPTION OF THE INVENTION

According to the present invention, there are provided the following means:

(1) A dispersion of a water-insoluble colorant, comprising: fine particles of at least one kind of water-insoluble colorant dispersed in a water-containing medium; and a polymer compound or surfactant having a structural unit represented by formula (I):

Formula (I)

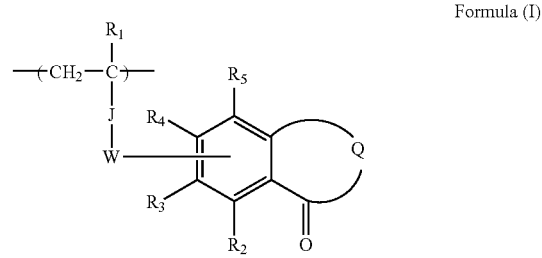

wherein $R_1$ represents a hydrogen atom or a substituent; one of $R_2$ to $R_5$ represents a single bond which bonds to W, and the others each independently represent a hydrogen atom or a substituent; Q represents a group of atoms necessary for forming, with the carbon atoms, a ring; J represents —CO—, —COO—, —CONR$_6$—, —OCO—, a methylene group, a phenylene group, or —C$_6$H$_4$CO—; $R_6$ represents a hydrogen atom, an alkyl group, an aryl group or an aralkyl group; W represents a single bond or a divalent linking group.

(2) The dispersion of a water-insoluble colorant as described in the above item (1), wherein the polymer compound or surfactant additionally has a structural unit having at least one kind of acid group as hydrophilic unit.

(3) The dispersion of a water-insoluble colorant as described in the above item (2), wherein the acid group is selected from the group consisting of a carboxylic acid group, a sulfonic acid group, a hydroxyl group, and a phosphoric acid group.

(4) The dispersion of a water-insoluble colorant as described in any one of the above items (1) to (3), wherein the unit represented by formula (I) is a unit represented by formula (II):

Formula (II)

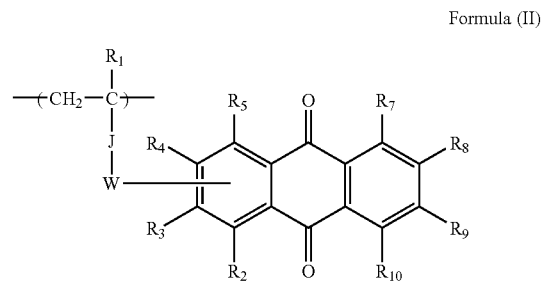

wherein $R_7$ to $R_{10}$ each independently represent a hydrogen atom or a substituent; $R_1$ to $R_5$, J, and W in formula (II) have the same meanings as $R_1$ to $R_5$, J, and W in formula (I), respectively.

(5) The dispersion of a water-insoluble colorant as described in any one of the above items (1) to (3), wherein the unit represented by formula (I) is a unit represented by formula (III):

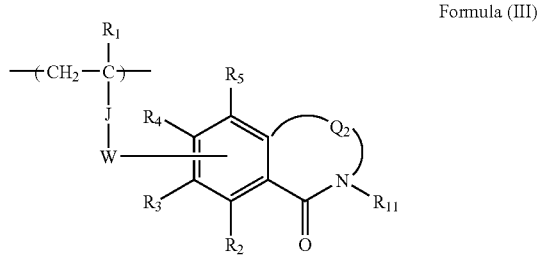

Formula (III)

wherein $Q_2$ represents a group of atoms necessary for forming, with the carbon atoms and the nitrogen atom, a ring; $R_{11}$ represents a hydrogen atom or a substituent; when $R_{11}$ represents a substituent, $R_{11}$ may further bind to any of the atoms constituting $Q_2$, to form a fused ring; $R_1$ to $R_5$, J, and W in formula (III) have the same meanings as $R_1$ to $R_5$, J, and W in formula (I), respectively.

(6) The dispersion of a water-insoluble colorant as described in the above item (5), wherein the unit represented by formula (III) is a unit represented by formula (IV) or (V):

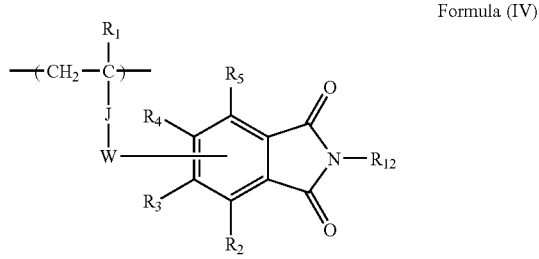

Formula (IV)

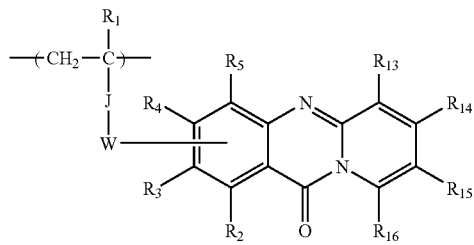

Formula (V)

wherein $R_{12}$, $R_{13}$, $R_{14}$, $R_{15}$, and $R_{16}$ each independently represents a hydrogen atom or a substituent; $R_1$ to $R_5$, J, and W in formula (IV) or (V) have the same meanings as $R_1$ to $R_5$, J, and W in formula (I), respectively.

(7) The dispersion of a water-insoluble colorant as described in any one of the above items (1) to (6), wherein the average particle diameter of the fine particles is 5 to 100 nm.

(8) The dispersion of a water-insoluble colorant as described in any one of the above items (1) to (7), wherein the water-insoluble colorant is an organic pigment selected from the group consisting of quinacridone organic pigments, diketopyrrolopyrrole organic pigments, mono azo yellow organic pigments, condensed azo organic pigments, quinophthalone organic pigments, benz-imidazolone organic pigments, and disazo yellow organic pigments.

(9) A method of producing the water-insoluble colorant dispersion as described in any one of the above items (1) to (8), comprising the steps of: dissolving the water-insoluble colorant, the polymer compound or surfactant, and a base, into an aprotic water-soluble organic solvent; bringing the resultant solution into contact with an aqueous medium; and thus forming the fine particles of the water-insoluble colorant dispersed in the water-containing medium.

(10) The method of producing the water-insoluble colorant dispersion as described in the above item (9), further including the steps of: aggregating the fine particles into redispersible agglomerates (flocks), separating the agglomerates from the medium, and redispersing the agglomerates to form fine particles redispersed in a redispersion medium.

(11) The method of producing the water-insoluble colorant dispersion as described in the above item (9) or (10), further bringing the dispersion into a heat-treatment before or after the redispersion.

(12) A recording liquid comprising the fine particles of the water-insoluble colorant as described in any one of the above items (1) to (8), wherein the fine particles of the water-insoluble colorant is contained in an amount of 0.1 to 20% by mass with respect to a total mass of the recording liquid.

(13) The recording liquid as described in the above item (12), wherein the recording liquid is an inkjet recording liquid.

(14) The recording liquid as described in the above item (12) or (13), further comprising a compound represented by formula (VI):

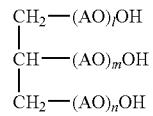

Formula (VI)

wherein l, m, and n each independently represent an integer of 1 or more, and l+m+n=3 to 15.

(15) A printed article which contains fine particles of a water-insoluble colorant, the printed article formed by the recording liquid as described in any one of the above items (12) to (14), using a provider, wherein the provider has a function to adjust an applied amount or concentration of the recording liquid, thereby light-to-dark contrast of the printed article is adjusted.

(16) An image-forming method, which comprises:
providing a material, the recording liquid as described in any one of the items (12) to (14), and an image-forming apparatus; and
recording an image of the recording liquid on the material with the image-forming apparatus.

(17) An image-forming apparatus, comprising:
a storage unit of the recording liquid as described in any one of the items (12) to (14); and
an image-forming unit;
whereby the recording liquid is recorded on a material with the image-forming unit.

In the present specification, the term "agglomerate" is sometimes used to specifically refer to an assembly of fine particles weakly stick to each other to a degree that allows redispersion. Further, the term "aggregate" is used as a general concept including the above "agglomerate" and assemblies of particles in any other modes.

Hereinafter, the present invention is explained in detail. However, the present invention is not meant to be limited thereto.

The dispersion according to the present invention is a water-insoluble colorant dispersion containing fine particles of a water-insoluble colorant dispersed in a water-containing medium and additionally containing a polymer compound or surfactant having a structural unit represented by formula (I).

Hereinafter, formula (I) is explained in detail. In formula (I), $R_1$ represents a hydrogen atom or a substituent. One of $R_2$ to $R_5$ represents a single bond which bonds to W, and the others each independently represent a hydrogen atom or a substituent. Q represents a group of atoms necessary for forming a ring together with the carbon atoms (i.e. the three carbon atoms in —C=C—C(O)—). J represents —CO—, —COO—, —CONR$_6$—, —OCO—, a methylene group, a phenylene group, or —C$_6$H$_4$CO—; $R_6$ represents a hydrogen atom, an alkyl group, an aryl group, or an aralkyl group; W represents a single bond or a divalent linking group.

As a substituent, any one selected from the substituent group Z shown below can be used. That is, as examples of the substituent, the substituent group Z, includes an alkyl group (preferably an alkyl group having 1 to 30 carbon atoms, more preferably 1 to 20 carbon atoms, and particularly preferably 1 to 10 carbon atoms, e.g., methyl, ethyl, isopropyl, tert-butyl, n-octyl, n-decyl, n-hexadecyl), a cycloalkyl group (preferably a cycloalkyl group having 3 to 30 carbon atoms, more preferably 3 to 20 carbon atoms, and particularly preferably 3 to 10 carbon atoms, e.g., cyclopropyl, cyclopentyl, cyclohexyl), an alkenyl group (preferably an alkenyl group having 2 to 30 carbon atoms, more preferably 2 to 20 carbon atoms, and particularly preferably 2 to 10 carbon atoms, e.g., vinyl, allyl, 2-butenyl, 3-pentenyl), an alkynyl group (preferably an alkynyl group having 2 to 30 carbon atoms, more preferably 2 to 20 carbon atoms, and particularly preferably 2 to 10 carbon atoms, e.g., propargyl, 3-pentynyl), an aryl group (preferably an aryl group having 6 to 30 carbon atoms, more preferably 6 to 20 carbon atoms, and particularly preferably 6 to 12 carbon atoms, e.g., phenyl, p-methylphenyl, naphthyl, anthranyl), an amino group (preferably an amino group having 0 to 30 carbon atoms, more preferably 0 to 20 carbon atoms, and particularly preferably 0 to 10 carbon atoms, e.g., amino, methylamino, dimethylamino, diethylamino, dibenzylamino, diphenylamino, ditolylamino), an alkoxy group (preferably an alkoxy group having 1 to 30 carbon atoms, more preferably 1 to 20 carbon atoms, and particularly preferably 1 to 10 carbon atoms, e.g., methoxy, ethoxy, butoxy, 2-ethylhexyloxy), an aryloxy group (preferably an aryloxy group having 6 to 30 carbon atoms, more preferably 6 to 20 carbon atoms, and particularly preferably 6 to 12 carbon atoms, e.g., phenyloxy, 1-naphthyloxy, 2-naphthyloxy), a heterocyclicoxy group (preferably a heterocyclicoxy group having 1 to 30 carbon atoms, more preferably 1 to 20 carbon atoms, and particularly preferably 1 to 12 carbon atoms, e.g., pyridyloxy, pyrazyloxy, pyrimidyloxy, quinolyloxy), an acyl group (preferably an acyl group having 1 to 30 carbon atoms, more preferably 1 to 20 carbon atoms, and particularly preferably 1 to 12 carbon atoms, e.g., acetyl, benzoyl, formyl, pivaloyl), an alkoxycarbonyl group (preferably an alkoxycarbonyl group having 2 to 30 carbon atoms, more preferably 2 to 20 carbon atoms, and particularly preferably 2 to 12 carbon atoms, e.g., methoxycarbonyl, ethoxycarbonyl), an aryloxycarbonyl group (preferably an aryloxycarbonyl group having 7 to 30 carbon atoms, more preferably 7 to 20 carbon atoms, and particularly preferably 7 to 12 carbon atoms, e.g., phenyloxycarbonyl), an acyloxy group (preferably an acyloxy group having 2 to 30 carbon atoms, more preferably 2 to 20 carbon atoms, and particularly preferably 2 to 10 carbon atoms, e.g., acetoxy, benzoyloxy), an acylamino group (preferably an acylamino group having 2 to 30 carbon atoms, more preferably 2 to 20 carbon atoms, and particularly preferably 2 to 10 carbon atoms, e.g., acetylamino, benzoylamino), an alkoxycarbonylamino group (preferably an alkoxycarbonylamino group having 2 to 30 carbon atoms, more preferably 2 to 20 carbon atoms, and particularly preferably 2 to 12 carbon atoms, e.g., methoxycarbonylamino), an aryloxycarbonylamino group (preferably an aryloxycarbonylamino group having 7 to 30 carbon atoms, more preferably 7 to 20 carbon atoms, and particularly preferably 7 to 12 carbon atoms, e.g., phenyloxycarbonylamino), a sulfonylamino group (preferably a sulfonylamino group having 1 to 30 carbon atoms, more preferably 1 to 20 carbon atoms, and particularly preferably 1 to 12 carbon atoms, e.g., methanesulfonylamino, benzenesulfonylamino), a sulfamoyl group (preferably a sulfamoyl group having 0 to 30 carbon atoms, more preferably 0 to 20 carbon atoms, and particularly preferably 0 to 12 carbon atoms, e.g., sulfamoyl, methylsulfamoyl, dimethylsulfamoyl, phenylsulfamoyl), a carbamoyl group (preferably a carbamoyl group having 1 to 30 carbon atoms, more preferably 1 to 20 carbon atoms, and particularly preferably 1 to 12 carbon atoms, e.g., carbamoyl, methylcarbamoyl, diethylcarbamoyl, phenylcarbamoyl), an alkylthio group (preferably an alkylthio group having 1 to 30 carbon atoms, more preferably 1 to 20 carbon atoms, and particularly preferably 1 to 12 carbon atoms, e.g., methylthio, ethylthio), an arylthio group (preferably an arylthio group having 6 to 30 carbon atoms, more preferably 6 to 20 carbon atoms, and particularly preferably 6 to 12 carbon atoms, e.g., phenylthio), a heterocyclicthio group (preferably a heterocyclicthio group having 1 to 30 carbon atoms, more preferably 1 to 20 carbon atoms, and particularly preferably 1 to 12 carbon atoms, e.g., pyridylthio, 2-benzimidazolylthio, 2-benzoxazolylthio, 2-benzothiazolylthio), a sulfonyl group (preferably a sulfonyl group having 1 to 30 carbon atoms, more preferably 1 to 20 carbon atoms, and particularly preferably 1 to 12 carbon atoms, e.g., mesyl, tosyl), a sulfinyl group (preferably a sulfinyl group having 1 to 30 carbon atoms, more preferably 1 to 20 carbon atoms, and particularly preferably 1 to 12 carbon atoms, e.g., methanesulfinyl, benzenesulfinyl), a ureido group (preferably a ureido group having 1 to 30 carbon atoms, more preferably 1 to 20 carbon atoms, and particularly preferably 1 to 12 carbon atoms, e.g., ureido, methylureido, phenylureido), a phosphoric acid amido group (preferably a phosphoric acid amido group having 1 to 30 carbon atoms, more preferably 1 to 20 carbon atoms, and particularly preferably 1 to 12 carbon atoms, e.g., diethylphosphoric acid amido, phenylphosphoric acid amido), a hydroxyl group, a mercapto group, a halogen atom (e.g., a fluorine atom, a chlorine atom, a bromine atom, an iodine atom; more preferably a fluorine atom), a cyano group, a sulfo group, a carboxyl group, an oxo group, a nitro group, a hydroxamic acid group, a sulfino group, a hydrazino group, an imino group, a heterocyclic group (preferably a heterocyclic group having 1 to 30 carbon atoms, and more preferably 1 to 12 carbon atoms; as hetero atoms, e.g., nitrogen, oxygen, sulfur; and specifically, e.g., imidazolyl, pyridyl, quinolyl, furyl, thienyl, piperidyl, morpholino, benzoxazolyl, benzimidazolyl, benzothiazolyl, carbazolyl, azepinyl), a silyl group (preferably a silyl group having 3 to 40 carbon atoms, more preferably 3 to 30 carbon atoms, and particularly preferably 3 to 24 carbon atoms, e.g., trimethylsilyl, triphenylsilyl), and a silyloxy group (preferably a silyloxy group having 3 to 40 carbon atoms, more preferably 3 to 30 carbon atoms, and particularly preferably 3 to 24 carbon atoms, e.g., trimethylsilyloxy, triphenylsilyloxy). These substituents may be further substituted with at least one substituent selected from the substituent group Z.

J represents —CO—, —COO—, —CONR$_6$—, —OCO—, a methylene group, a phenylene group, or —C$_6$H$_4$CO—. Among them, as a J, —CO—, —CONR$_6$—, a phenylene group, or —C$_6$H$_4$CO— is preferable, and —C$_6$H$_4$CO— is more preferable. R$_6$ represents a hydrogen atom, an alkyl group, an aryl group or an aralkyl group; R$_6$ is preferably a hydrogen atom, an alkyl group, or an aryl group; and the preferred range has the same meaning as the preferred range of the alkyl group and the aryl group described about the substituent Z.

Q represents a group of atoms necessary for forming, with the carbon atoms, a ring. The atoms for constituting a ring are preferably carbon atoms, nitrogen atoms, oxygen atoms, silicon atoms, phosphor atoms and/or sulfur atoms. Preferred atoms are carbon atoms, nitrogen atoms, oxygen atoms and/or sulfur atoms; further preferred atoms are carbon atoms, nitrogen atoms and/or sulfur atoms; and more preferred atoms are carbon atoms and/or nitrogen atoms. Q which is composed of these atoms may be saturated or unsaturated. When Q has a potential to be substituted, it may be substituted. The substituent on Q has the same meaning as the group which was explained about the above mentioned Z.

In formula (I), examples of the ring structure group binding to W (i.e. the ring structure including Q(=O) and the aryl group having R$_1$ to R$_5$) include the following ring structure groups (i) to (viii) which may be substituted (in these formulas, * represents the site binding to W). Among them, the ring structure groups (i), (ii), (iii), (vi), (vii), and (viii), which may be substituted, are preferable; the ring structure groups (i), (vii), and (viii), which may be substituted, are more preferable; and the ring structure group (i) is particularly preferable.

From a different viewpoint, the following ring structure groups (i) to (viii) are divided into a group where Q in formula (I) contains no heteroatom ((i), (ii), (iv)) and a group where Q contains a heteroatom ((iii), and (v) to (viii)), and the groups (vii) and (viii) are preferable in the latter group.

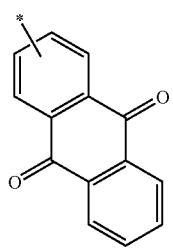

(i)

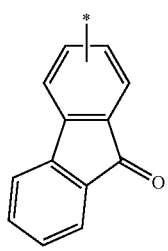

(ii)

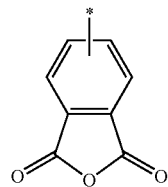

(iii)

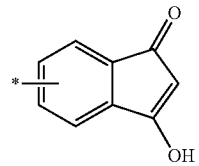

(iv)

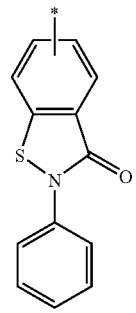

(v)

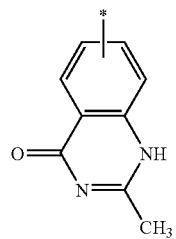

(vi)

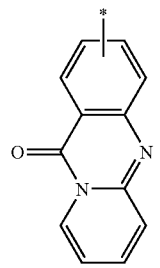

(vii)

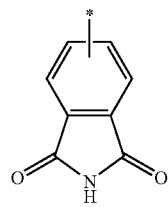

(viii)

W represents a single bond or a divalent linking group. Examples of the divalent linking group represented by W include an imino group, a straight-chain, branched or cyclic alkylene group (preferably an alkylene group having 1 to 30 carbon atoms, more preferably 1 to 12 carbon atoms, and further preferably 1 to 4 carbon atoms, e.g., methylene, ethylene, propylene, butylene, pentylene, hexylene, octylene, and decylene), an aralkylene group (preferably an aralkylene group having 7 to 30 carbon atoms, and more preferably 7 to 13 carbon atoms, e.g., benzylidene and cinnamylidene), an arylene group (preferably an arylene group having 6 to 30 carbon atoms, and more preferably 6 to 15 carbon atoms, e.g., phenylene, cumenylene, mesitylene, tolylene and xylylene), —$(CR_{11}R_{12})_n$NHCONH—, and —$(CR_{11}R_{12})_n$CONH— ($R_{11}$ and $R_{12}$ represent a hydrogen group or a substituent, preferably a hydrogen atom, an alkyl group, a halogen atom, or a hydroxyl group, more preferably a hydrogen atom or an alkyl group, furthermore preferably a hydrogen atom. $R_{11}$s and $R_{12}$s may be the same or different from each other. n represents an integer, preferably an integer of 1 to 10, more preferably an integer of 2 to 5). Among them, —$(CR_{11}R_{12})_n$NHCONH—, —$(CR_{11}R_{12})_n$CONH—, and an imino group are preferable, more preferably an imino group. W may have additional substituent groups. W may be a divalent linking group formed by combining two or more groups selected from the aforementioned groups for W. In addition, W favorably has an ether bond therein.

W preferably represents a single bond, an alkylene group, or an arylene group, more preferably a single bond or an alkylene group, furthermore preferably a single bond.

In formula (I), $R_1$ represents a hydrogen atom or a substituent. $R_1$ preferably represents a hydrogen atom, an alkyl group, or an aryl group, more preferably a hydrogen atom or an alkyl group. $R_2$ to $R_5$ represent a single bond, a hydrogen atom, or a substituent, and any one of $R_2$ to $R_5$ represents a single bond to bind to W. Each of the groups $R_2$ to $R_5$, when it is not a single bond binding to W, is preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group; more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group; and further more preferably a hydrogen atom, an acyl group, a hydroxy group, a halogen atom, or a cyano group.

In the present invention, the polymer compound or surfactant having the structural unit (repeating unit) represented by formula (I) is preferably a polymer compound or surfactant having the structural unit represented by formula (II) or (III), and the polymer compound or surfactant having the structural unit represented by formula (III) is more preferably a polymer compound or surfactant having the structural unit represented by formula (IV) or (V).

In formula (II), $R_7$ to $R_{10}$ each independently represent a hydrogen atom or a substituent. When $R_7$ to $R_{10}$ represent a substituent, the substituent represents any one selected from the substituent group Z. Each of the groups $R_7$ to $R_{10}$ is preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group; more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group; further more preferably a hydrogen atom, an acyl group, a hydroxy group, a halogen atom, or a cyano group; and particularly preferably a hydrogen atom.

In formula (II), $R_1$ to $R_5$, J, and W have the same meanings as $R_1$ to $R_5$, J, and W in formula (I) above, and the favorable ranges thereof are also the same as those described for formula (I).

As for favorable combinations of substituent groups in formula (II), the following combination (a) is preferable; the following combination (b) is more preferable; the following combination (c) is still more preferable; and the following combination (d) is particularly preferable.

(a) J represents —CO—, —$CONR_6$—, a phenylene group, or —$C_6H_4CO$—, where $R_6$ represents a hydrogen atom, an alkyl group, or an aryl group. W represents a single bond, an imino group, an alkylene group, or an arylene group. $R_1$ represents a hydrogen atom, an alkyl group, or an aryl group. $R_2$ to $R_5$ each independently represent a single bond, a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group, and any one of $R_2$ to $R_5$ represents a single bond to bond to W. $R_7$ to $R_{10}$ each independently represent a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group.

(b) J represents —$C_6H_4CO$—, —$CONR_6$—, or a phenylene group, where $R_6$ represents a hydrogen atom or an alkyl group. W represents an imino group, a single bond, or an arylene group. $R_1$ represents a hydrogen atom or an aryl group. $R_2$ to $R_5$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group, and any one of $R_2$ to $R_5$ represents a single bond to bond to W. $R_7$ to $R_{10}$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group.

(c) J represents —$C_6H_4CO$— or —$CONR_6$—. $R_6$ represents a hydrogen atom. W represents an imino group or a single bond. $R_1$ represents a hydrogen atom or an aryl group. $R_2$ to $R_5$ each independently represent a hydrogen atom, an acyl group, a hydroxyl group, a halogen atom, or a cyano group, and any one of $R_2$ to $R_5$ represents a single bond to bond to W. $R_7$ to $R_{10}$ each independently represent a hydrogen atom, an acyl group, a hydroxyl group, a halogen atom, or a cyano group.

(d) J represents —$C_6H_4CO$—. W represents an imino group. $R_1$ represents a hydrogen atom or an aryl group. $R_2$ to $R_5$ each independently represent a hydrogen atom, an acyl group, a hydroxyl group, a halogen atom, or a cyano group, and any one of $R_2$ to $R_5$ represents a single bond to bond to W. $R_7$ to $R_{10}$ each independently represent a hydrogen atom.

Next, formula (III) is explained in detail. In formula (III), $Q_2$ represents a group of atoms necessary for forming a ring together with the carbon atoms and the nitrogen atom. The atoms for constituting the ring are preferably carbon atoms, nitrogen atoms, oxygen atoms, silicon atoms, phosphor atoms and/or sulfur atoms. Preferred atoms are carbon atoms, nitrogen atoms, oxygen atoms and/or sulfur atoms; further preferred atoms are carbon atoms, nitrogen atoms and/or sulfur atoms; and more preferred atoms are carbon atoms and/or nitrogen atoms. $Q_2$ which is composed of these atoms may be saturated or unsaturated. When $Q_2$ has a potential to be substituted, it may be substituted. The substituent on $Q_2$ has the same meaning as the group which was explained about the above mentioned Z.

$R_{11}$ represents a hydrogen atom or a substituent. The substituent includes the substituent group Z as explained above. $R_{11}$ preferably represents a hydrogen atom, an alkyl group, or an aryl group; more preferably a hydrogen atom or an alkyl group. When $R_{11}$ represents a substituent, $R_{11}$ may further bind to any of the atoms constituting $Q_2$, to form a fused ring.

In formula (III), $R_1$ to $R_5$, J, and W have the same meanings as $R_1$ to $R_5$, J, and W in formula (I) above, and the favorable ranges thereof are also the same as those described for formula (I).

Formula (III) is further preferably formula (IV) or formula (V).

In formula (IV), $R_{12}$ represents a hydrogen atom or a substituent. The substituent includes the substituent group Z. $R_{12}$ represents a hydrogen atom, an alkyl group, or an aryl group; more preferably a hydrogen atom or an aryl group. $R_1$ to $R_5$, J, and W have the same meanings as $R_1$ to $R_5$, J, and W in formula (I) above, and the favorable ranges thereof are also the same as those described for formula (I).

In formula (V), $R_{13}$, $R_{14}$, $R_{15}$, and $R_{16}$ each independently represent a hydrogen atom or a substituent. The substituent includes the substituent group Z. Each of $R_{13}$, $R_{14}$, $R_{15}$, and $R_{16}$ is preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group; more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group; further more preferably a hydrogen atom, an acyl group, a hydroxy group, a halogen atom, or a cyano group; and particularly preferably a hydrogen atom. $R_1$ to $R_5$, J, and W have the same meanings as $R_1$ to $R_5$, J, and W in formula (I) above, and the favorable ranges thereof are also the same as those described for formula (I).

As for favorable combinations of substituent groups in formula (IV), the following combination (IV-a) is preferable; the following combination (IV-b) is more preferable; the following combination (IV-c) is still more preferable; and the following combination (IV-d) is particularly preferable.

(IV-a) J represents —CO—, —CONR$_6$—, a phenylene group, or —C$_6$H$_4$CO—, where $R_6$ represents a hydrogen atom, an alkyl group, or an aryl group. W represents a single bond, an imino group, an alkylene group, or an arylene group. $R_1$ represents a hydrogen atom, an alkyl group, or an aryl group. $R_2$ to $R_5$ each independently represent a single bond, a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group, and any one of $R_2$ to $R_5$ represents a single bond to bond to W. $R_{12}$ represents a hydrogen atom or an aryl group.

(IV-b) J represents —C$_6$H$_4$CO—, —CONR$_6$—, or a phenylene group, where $R_6$ represents a hydrogen atom or an alkyl group. W represents an imino group, a single bond, or an arylene group. $R_1$ represents a hydrogen atom or an aryl group. $R_2$ to $R_5$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group, and any one of $R_2$ to $R_5$ represents a single bond to bond to W. $R_{12}$ represents a hydrogen atom or an aryl group.

(IV-c) J represents —C$_6$H$_4$CO— or —CONR$_6$—. $R_6$ represents a hydrogen atom. W represents an imino group or a single bond. $R_1$ represents a hydrogen atom or an aryl group. $R_2$ to $R_5$ each independently represent a hydrogen atom, an acyl group, a hydroxyl group, a halogen atom, or a cyano group, and any one of $R_2$ to $R_5$ represents a single bond to bond to W. $R_{12}$ represents a hydrogen atom.

(IV-d) J represents —C$_6$H$_4$CO—. W represents an imino group. $R_1$ represents a hydrogen atom or an aryl group. $R_2$ to $R_5$ each independently represent a hydrogen atom, an acyl group, a hydroxyl group, a halogen atom, or a cyano group, and any one of $R_2$ to $R_5$ represents a single bond to bond to W. $R_{12}$ represents a hydrogen atom.

As for favorable combinations of substituent groups in formula (V), the following combination (V-a) is preferable; the following combination (V-b) is more preferable; the following combination (V-c) is still more preferable; and the following combination (V-d) is particularly preferable.

(V-a) J represents —CO—, —CONR$_6$—, a phenylene group, or —C$_6$H$_4$CO—, where $R_6$ represents a hydrogen atom, an alkyl group, or an aryl group. W represents a single bond, an imino group, an alkylene group, or an arylene group. $R_1$ represents a hydrogen atom, an alkyl group, or an aryl group. $R_2$ to $R_5$ each independently represent a single bond, a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group, and any one of $R_2$ to $R_5$ represents a single bond to bond to W. $R_{13}$, $R_{14}$, $R_{15}$, and $R_{16}$ each independently represent a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxy group, a halogen atom, a cyano group, a carboxyl group, a nitro group, or a heterocyclic group.

(V-b) J represents —C$_6$H$_4$CO—, —CONR$_6$—, or a phenylene group, where $R_6$ represents a hydrogen atom or an alkyl group. W represents an imino group, a single bond, or an arylene group. $R_1$ represents a hydrogen atom or an aryl group. $R_2$ to $R_5$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group, and any one of $R_2$ to $R_5$ represents a single bond to bond to W. $R_{13}$, $R_{14}$, $R_{15}$, and $R_{16}$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxy group, a halogen atom, or a cyano group.

(V-c) J represents —$C_6H_4CO$— or —$CONR_6$—. $R_6$ represents a hydrogen atom. W represents an imino group or a single bond. $R_1$ represents a hydrogen atom or an aryl group. $R_2$ to $R_5$ each independently represent a hydrogen atom, an acyl group, a hydroxyl group, a halogen atom, or a cyano group, and any one of $R_2$ to $R_5$ represents a single bond to bond to W. $R_{13}$, $R_{14}$, $R_{15}$, and $R_{16}$ each independently represent a hydrogen atom, an acyl group, a hydroxyl group, a halogen atom, or a cyano group.

(V-d) J represents —$C_6H_4CO$—. W represents an imino group. $R_1$ represents a hydrogen atom or an aryl group. $R_2$ to $R_5$ each independently represent a hydrogen atom, an acyl group, a hydroxyl group, a halogen atom, or a cyano group. Any one of $R_2$ to $R_5$ represents a single bond to bond to W. $R_{13}$, $R_{14}$, $R_{15}$, and $R_{16}$ each independently represent a hydrogen atom.

Next, the specific examples of formula (I) are shown below. However, the present invention is not limited thereto.

(1)

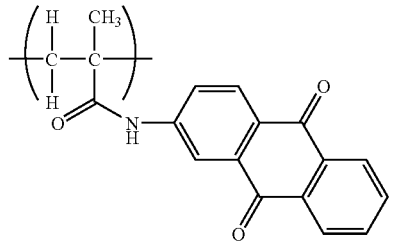

(2)

(3)

(4)

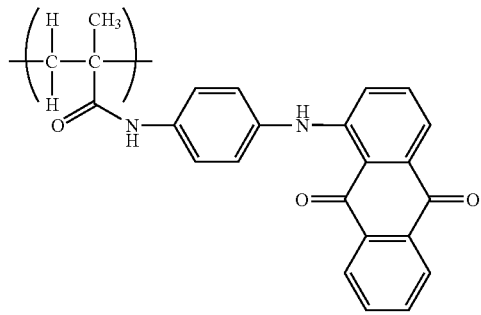

(5)

(6)

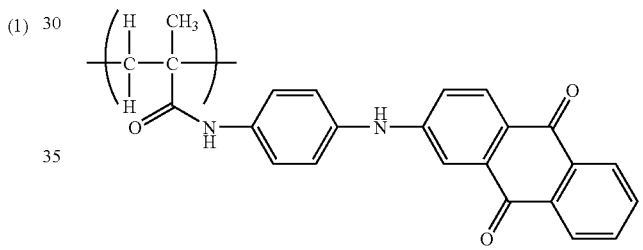

(7)

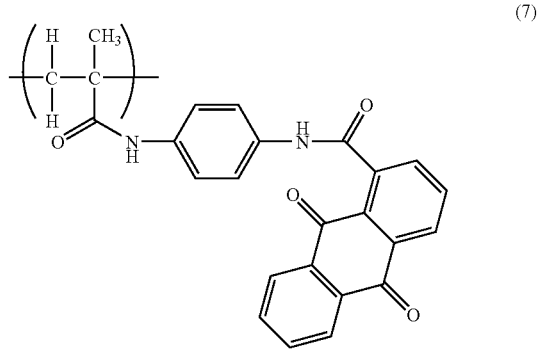

(8)

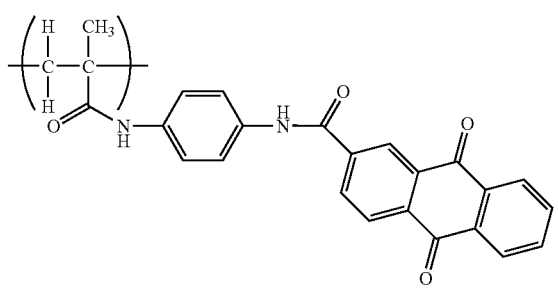

(9)
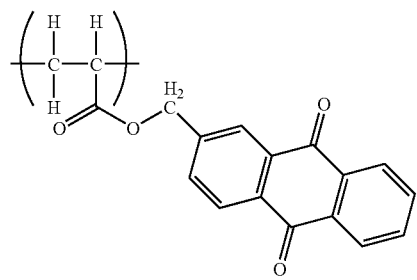
(10)
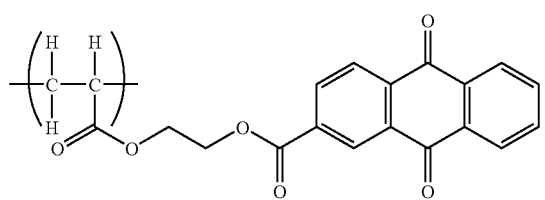
(11)
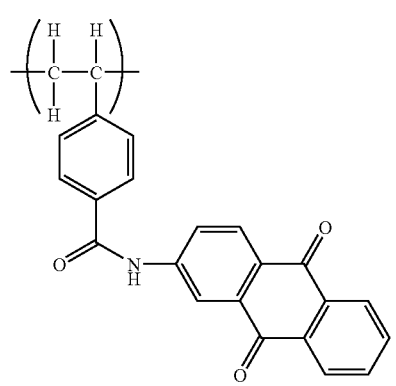
(12)
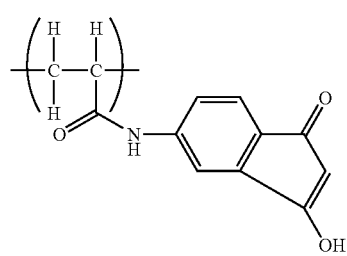
(13)
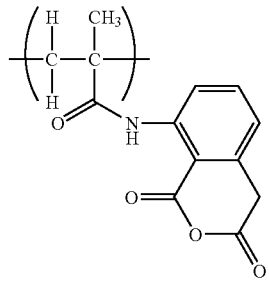
(14)
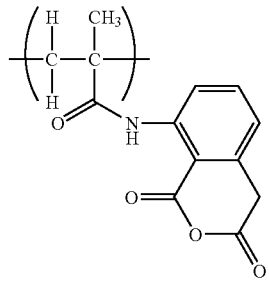
(15)
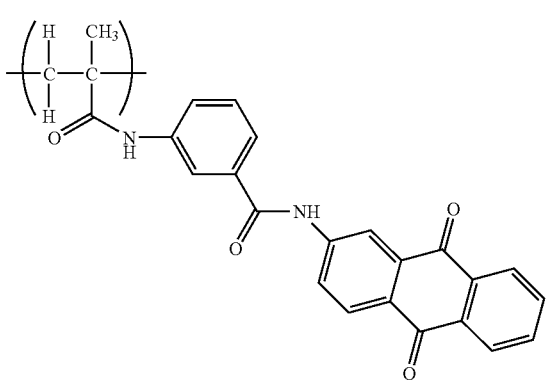
(16)
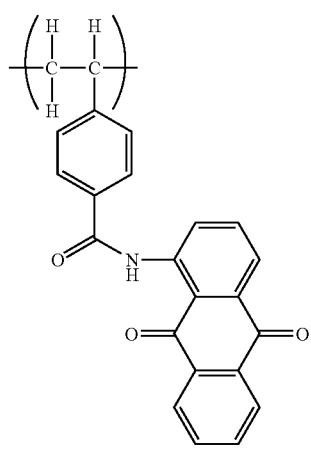
(17)
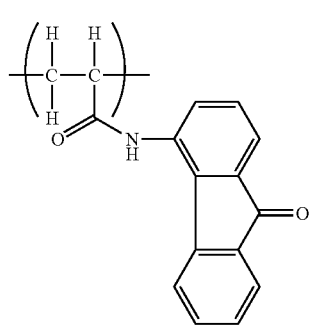

(18)

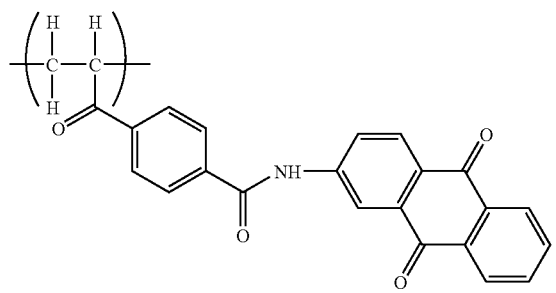

(19)

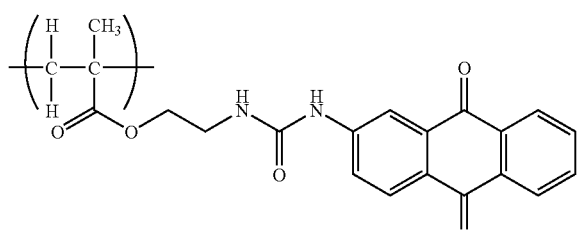

(20)

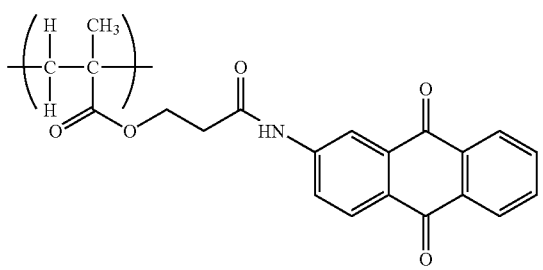

Next, the specific examples of the polymer compound having a structural unit represented by formula (I) (copolymer) are shown below. However, the present invention is not limited thereto. The end-groups of the polymer compound having a structural unit represented by formula (I) is not particularly limited, and may be, for example, a hydrogen atom or a polymerization terminator residue.

(P1)

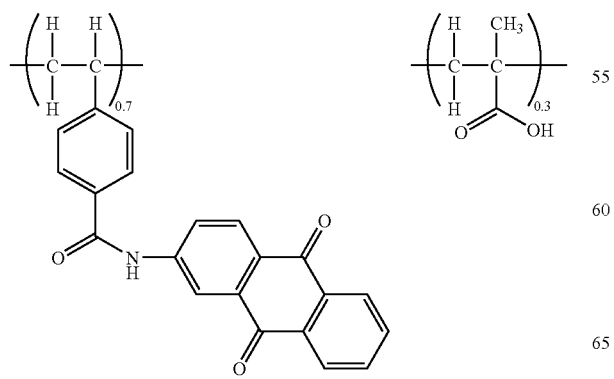

(P2)

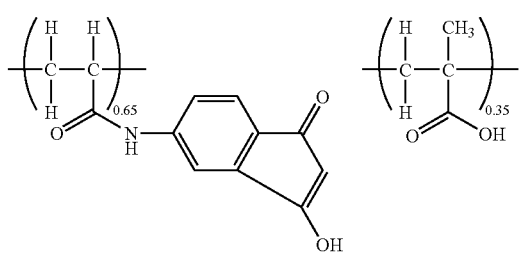

(P3)

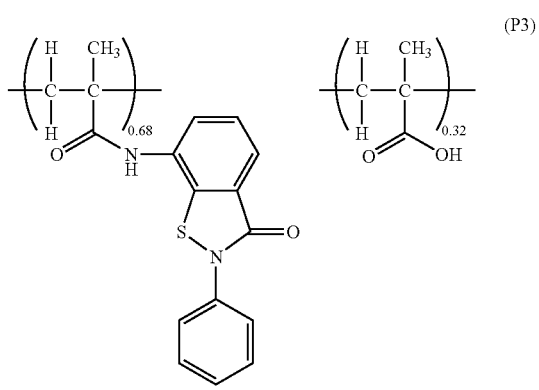

(P4)

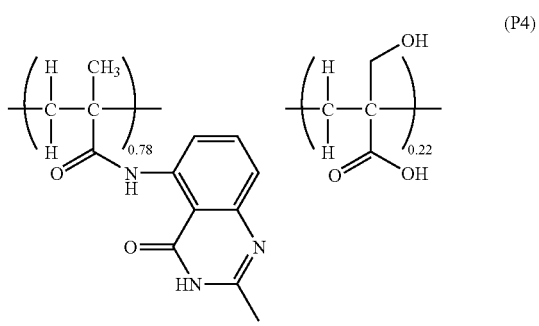

(P5)

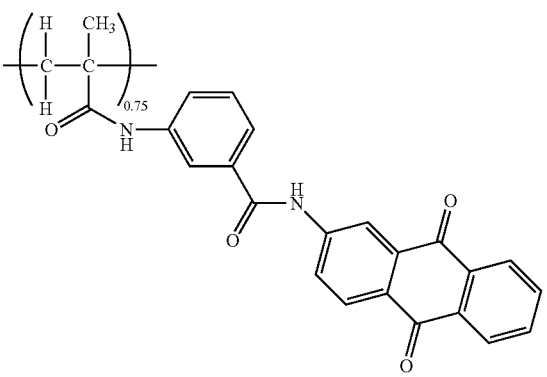

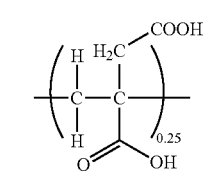

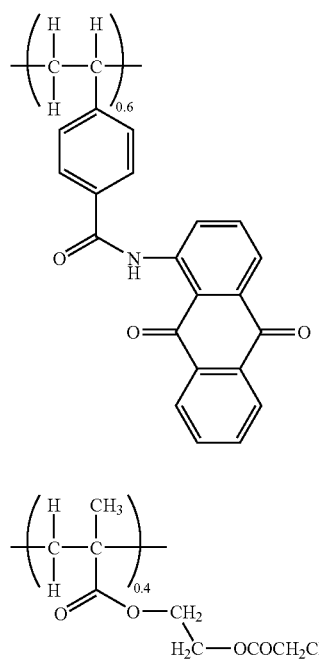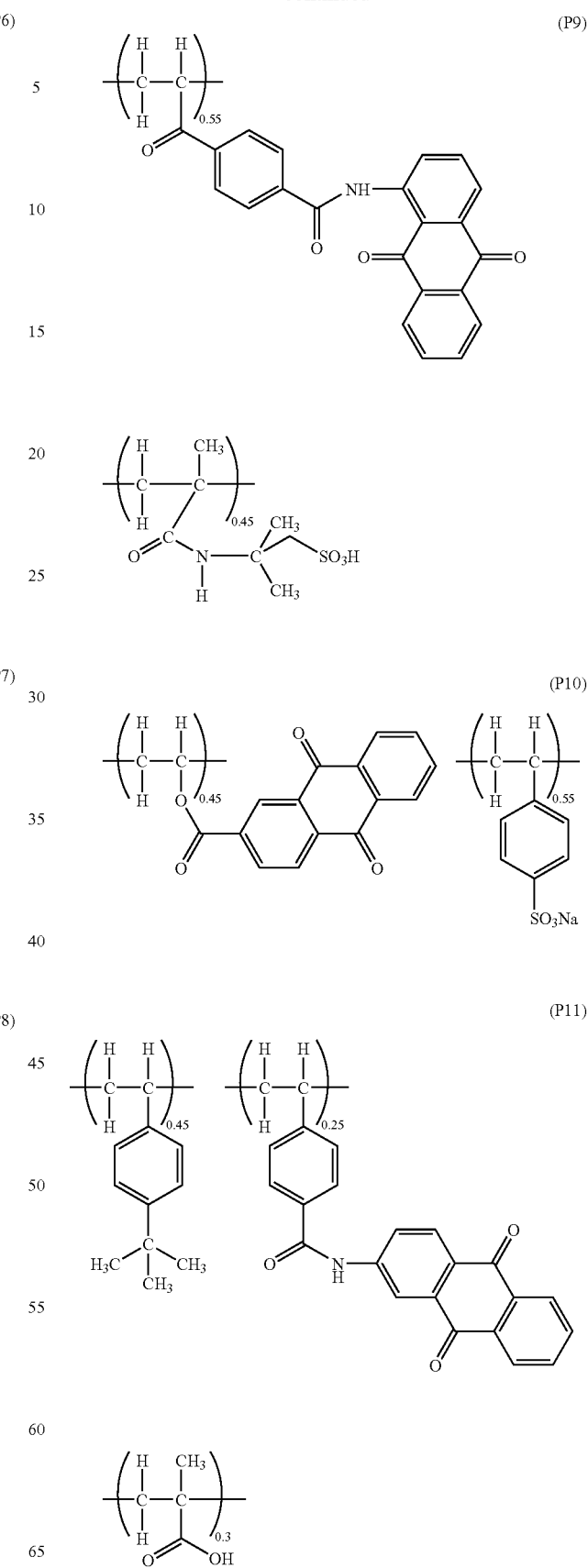

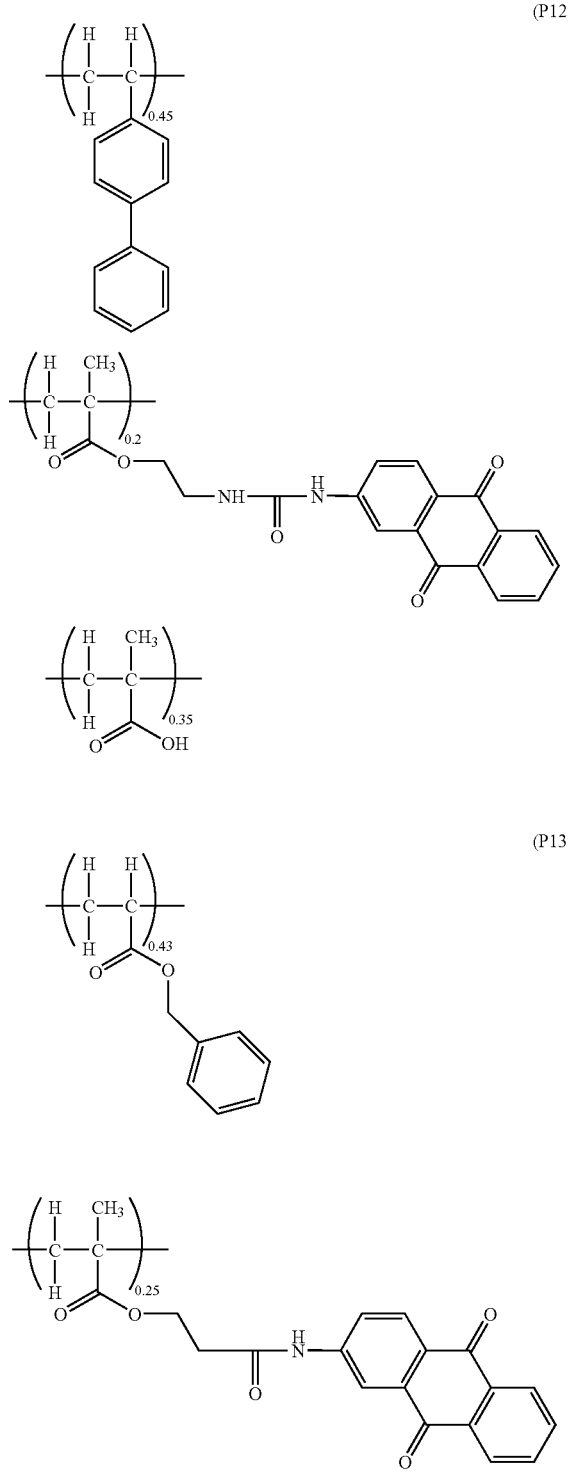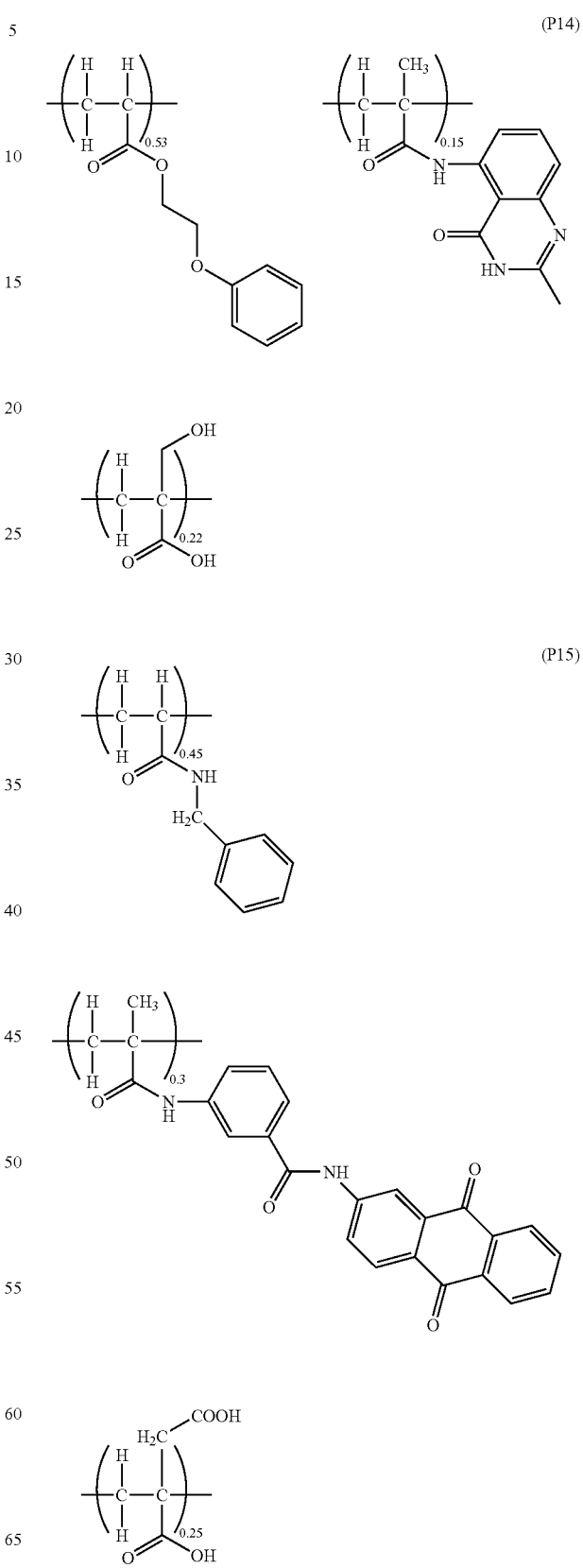

(P16)
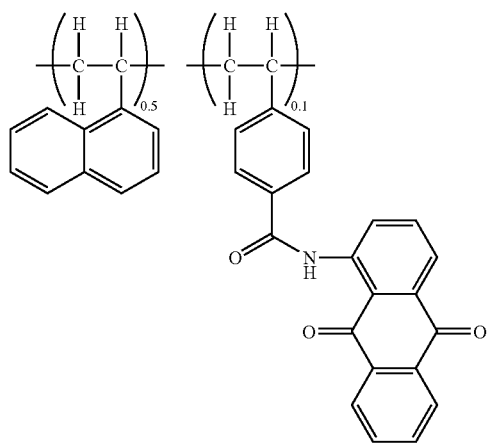
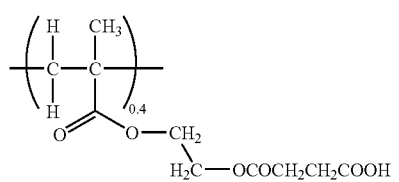
(P17)
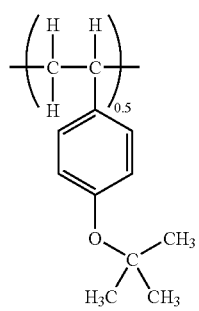
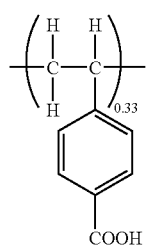
(P18)
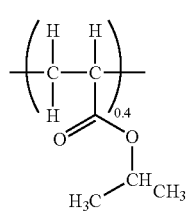
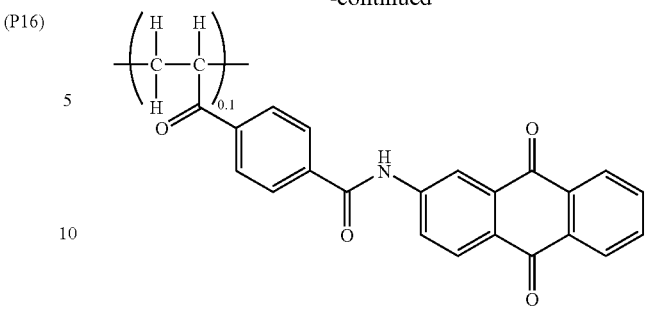
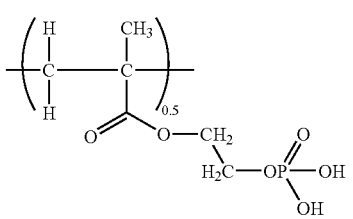
(P19)
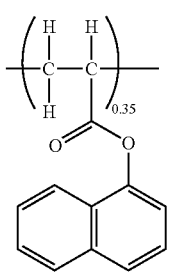
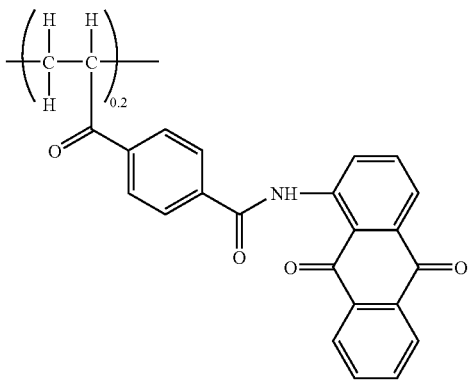
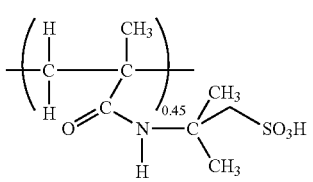
(P20)
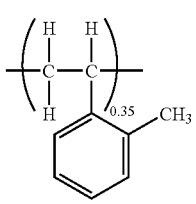

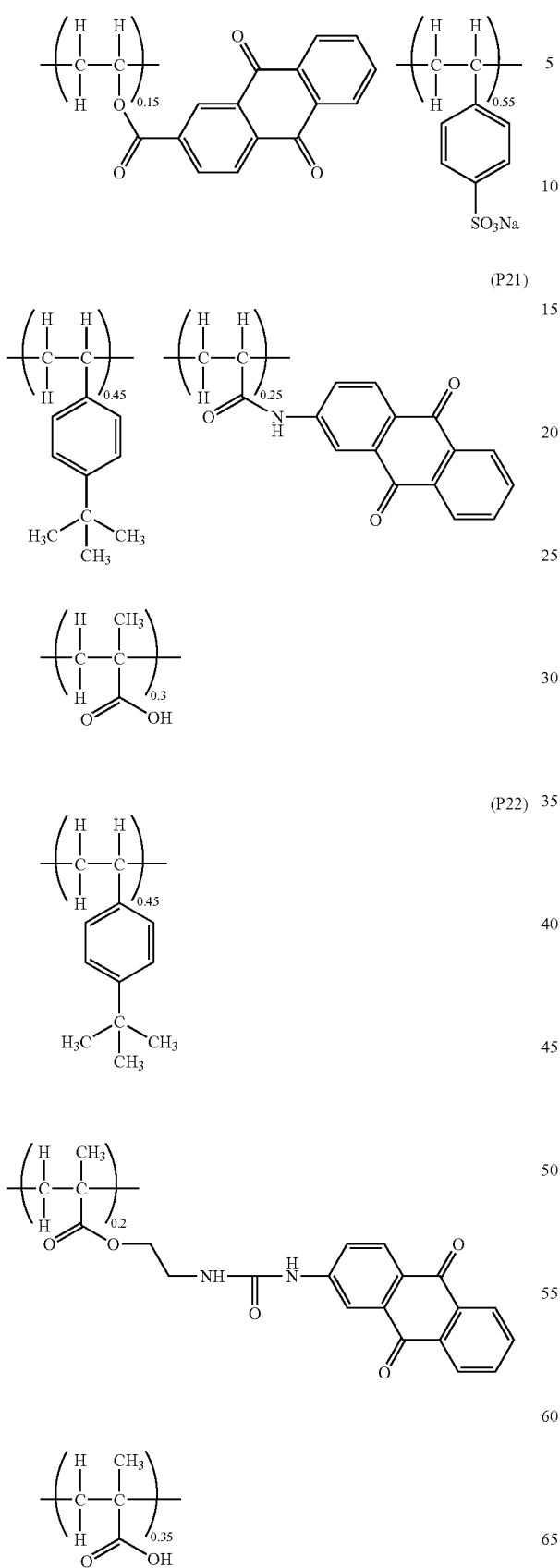
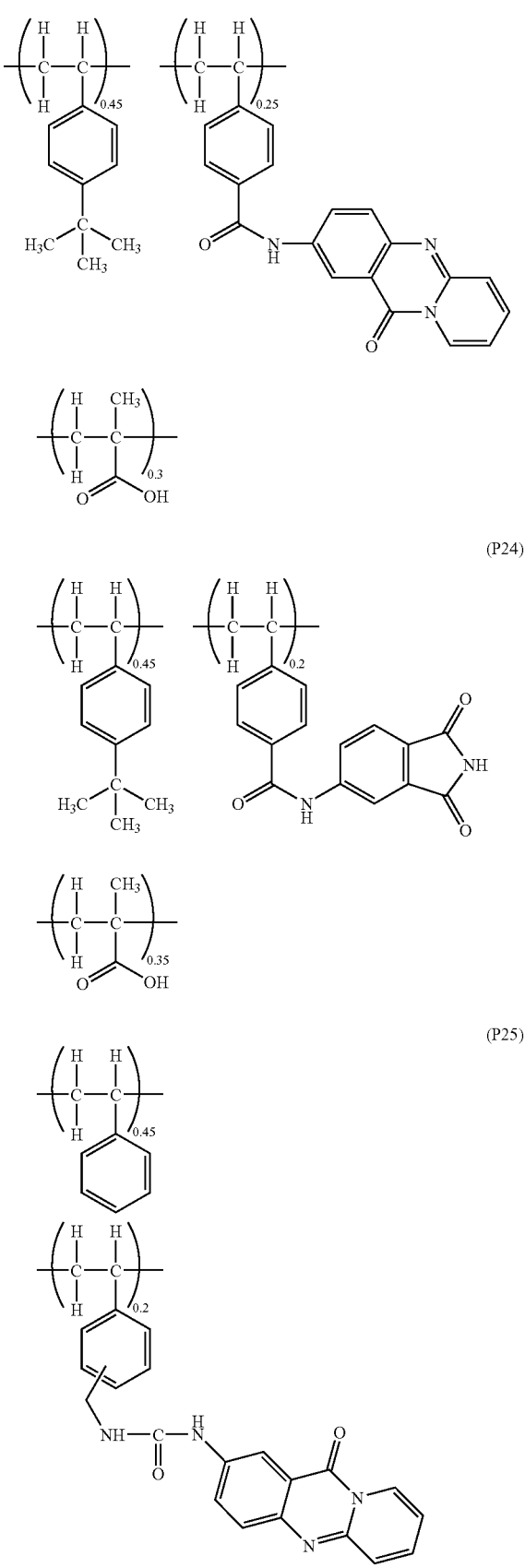

(P26)
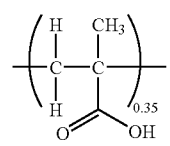
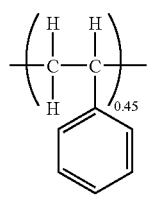 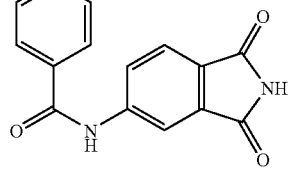
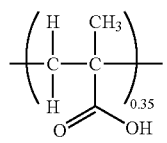

(P27)
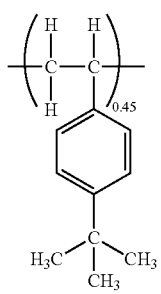 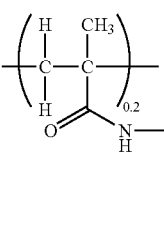
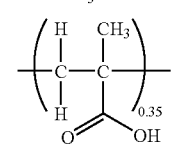

(P28)
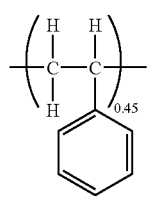
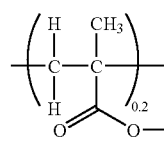
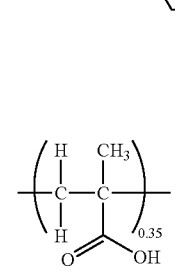 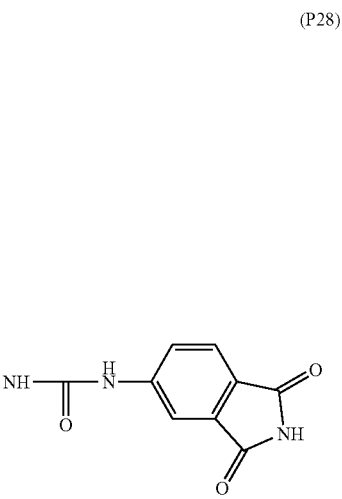

(P29)
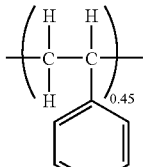 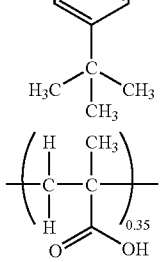
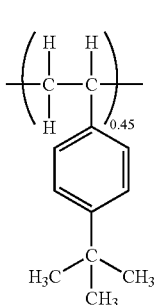

(P30)
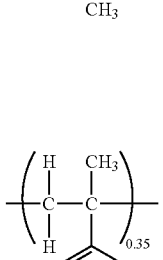

The content of the particular polymer compound or surfactant having a structural unit represented by formula (I) in the dispersion according to the present invention is not particularly limited, and preferably 5 to 90% by mass, more preferably 10 to 80% by mass, with respect to the total amount of the dispersion. The mass ratio thereof to the water-insoluble colorant (D/P ratio) is preferably 0.01 to 2.0, more preferably 0.1 to 1.0, still more preferably 0.1 to 0.5, and particularly preferably 0.1 to 0.3. It is speculated that, with the amount in the above range, the compound having a structural unit represented by formula (I) fully brings out unique interactions between it and the water-insoluble colorant, and, on the other hand, generates no extra products which float in the dispersion medium and adversely affects ink properties, and thus significantly enhances improvement of ink properties, when it is used to function as a dispersant in an ink composition containing a hydrophobic organic solvent.

The reason of the improved dispersion stability is stipulated as follows: The structural unit represented by formula (I) is characterized that it has a carbonyl-group-containing ring structure bonded through a benzene ring, with the carbonyl group binding to the benzene ring. By this specific ring structure, the benzene ring is largely polarized. This brings out strong intermolecular binding force between the benzene ring and the molecule on the pigment surface, and resultantly causes a strong adsorption of the copolymer compound having a structural unit represented by formula (I) to the pigment.

In order to further enhance the polarization of the benzene ring, it is advantageous that the ring structure further include a carbonyl group or a hetero atom.

Further, the ring structure having a more planar conformation has more improved adsorption efficiency to the pigment surface and further has a larger adsorption area inside the molecular structure, and thus attains better adhesion of the polymer compound to the pigment, resulting in better dispersion stability. The carbonyl-group-containing ring is highly planar when it is a 5-membered or 6-membered ring.

The ring structures (i) to (viii) satisfy the above, and thus it is stipulated that improved dispersion stability can be attained by these.

In addition, the molecular weight of the specific polymer compound or surfactant is not particularly limited, but the mass-average molecular weight thereof, if it is a polymer compound, is preferably 1,000 to 100,000, more preferably 5,000 to 50,000. When the molecular mass is too large, entanglement among polymeric chains becomes too large. As a result, it becomes difficult for them to serve as a dispersing agent, which occasionally makes it difficult to maintain a good dispersion state. It should be noted that when described simply as a molecular mass in the present invention, the molecular mass means mass average molecular mass, and the mass average molecular mass, unless otherwise specified, means an average molecular mass calculated in terms of polystyrene that is measured by gel permeation chromatography (carrier: tetrahydrofuran). The favorable range in molecular weight of other polymer compound or polymer dispersant described later is the same as the range above.

In the present specification, the molecular weight and the degree of dispersion are values measured by the following measuring methods.

[Measuring Methods for Molecular Weight and Degree of Dispersion]

The molecular weight and the degree of dispersion are measured using GPC (gel permeation chromatography) method, unless otherwise specified. It is preferred that the gel packed in the column used for the GPC method is a gel having an aromatic compound in the repeating unit, and an example thereof is a gel comprising a styrene/divinylbenzene copolymer. It is preferred to use two to six columns connected together. Examples of the solvent include ether-series solvents such as tetrahydrofuran; and amide-series solvents such as N-methylpyrrolidinone, and preferred is ether-series solvents such as tetrahydrofuran. The measurement is preferably performed at a solvent flow rate of 0.1 to 2 mL/min, and most preferably 0.5 to 1.5 mL/min. When the measurement is conducted within the range, the measurement can be performed more efficiently without imposing too much load to the measuring apparatus. The measurement is preferably performed at a temperature of 10 to 50° C. and, more preferably 20 to 40° C.

In the following, the specific conditions for the measurement of molecular weight are shown.

Apparatus: HLC-8220GPC (trade name, manufactured by Tosoh Corporation)
Detector: Differential refractometer (RI detector)
Precolumn: TSKGUARDCOLUMN MP(XL), 6 mm×40 mm (manufactured by Tosoh Corporation)
Sample-side column: The following column was used, and two columns were directly connected (all manufactured by Tosoh Corp.).
TSK-GEL Multipore-HXL-M 7.8 mm×300 mm
Reference-side column: Same as the sample-side column.
Thermostatic bath temperature: 40° C.
Moving bed: Tetrahydrofuran
Flow rate of sample-side moving bed: 1.0 mL/min
Flow rate of reference-side moving bed: 0.3 mL/min
Sample concentration: 0.1 wt %
Amount of sample injected: 100 μL
Data sampling time: 16 to 46 minutes after sample injection
Sampling pitch: 300 msec The containing mode in the dispersion of the polymer compound or surfactant is not limited in particular, and either being contained independently from other component or being collectively contained together with another component may be suitable. Thus, in the present invention, the terminology "dispersion containing the water-insoluble-colorant fine particles together with the specific polymer compound or surfactant" means that the specific polymer compound or surfactant may be contained in the water-insoluble-colorant fine particles in the dispersion or may coexist separately from the fine particles in the dispersion. Accordingly, the state in which a part of the polymer compound or surfactant may be in dissociation equilibrium between adsorption on and release from the fine particles, is also included in the above concept of containing mode. In the dispersion according to the present invention, it is preferable that the polymer compound or surfactant coexists particularly during generation of fine particles in the reprecipitation method described below, thus embedding the polymer compound or surfactant into or making it strongly adsorbed on the fine particles and thus, making it resistant to release, for example, by subsequent solvent substitution. It should be also noted that the term "dispersion" that is used in the present invention means a composition having prescribed fine-particles dispersed therein. The form of the dispersion is not particularly limited. The dispersion is used as a meaning to embrace a liquid composition (dispersion liquid), a past-like composition, and a solid composition.

An organic pigment that can be used as the water-insoluble colorant in the dispersion of the present invention is not limited in hue and structure thereof, and examples include a perylene, perynone, quinacridone, quinacridonequinone, anthraquinone, anthanthrone, benzimidazolone, condensed disazo, disazo, azo, indanthrone, indanthrene, quinophthalone, quinoxalinedione, metallic complex azo, phthalocyanine, triaryl carbonium, dioxazine, aminoanthraquinone, diketopyrrolopyrrole, naphthole AS, thioindigo, isoindoline, isoindolinone, pyranthrone or isoviolanthrone-series organic pigment, or a mixture thereof.

More specifically, examples of the organic pigment include perylene-series organic pigments, such as C.I. Pigment Red 179, C.I. Pigment Red 190, C.I. Pigment Red 224, and C.I. Pigment Violet 29; perynone-series organic pigments, such as C.I. Pigment Orange 43, and C.I. Pigment Red 194; quinacridone-series organic pigments, such as C.I. Pigment Violet 19, C.I. Pigment Violet 42, C.I. Pigment Red 122, C.I. Pigment Red 192, C.I. Pigment Red 202, C.I. Pigment Red 207, and C.I. Pigment Red 209; quinacridonequinone-series organic pigments, such as C.I. Pigment Red 206, C.I. Pigment Orange 48, and C.I. Pigment Orange 49; anthraquinone-series organic pigments, such as C.I. Pigment Yellow 147; anthanthrone-series organic pigments, such as C.I. Pigment Red 168; benzimidazolone-series organic pigments, such as C.I. Pigment Brown 25, C.I. Pigment Violet 32, C.I. Pigment Yellow 120, C.I. Pigment Yellow 180, C.I. Pigment Yellow 181, C.I. Pigment Orange 36, C.I. Pigment Orange 62, and C.I. Pigment Red 185; condensed disazo-series organic pigments, such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144 (C.I. No. 20735), C.I. Pigment Red 166, C.I. Pigment Yellow 219, C.I. Pigment Red 220, C.I. Pigment Red 221, C.I. Pigment Red 242, C.I. Pigment Red 248, C.I. Pigment Red 262, and C.I. Pigment Brown 23; disazo-series organic pigments, such as C.I. Pigment Yellow 13, C.I. Pigment Yellow 83, C.I. Pigment Yellow 155, and C.I. Pigment Yellow 188; azo-series organic pigments, such as C.I. Pigment Red 187, C.I. Pigment Red 170, C.I. Pigment Yellow 74, C.I. Pigment Red 48, C.I. Pigment Red 53, C.I. Pigment Orange 64, and C.I. Pigment Red 247; indanthrone-series organic pigments, such as C.I. Pigment Blue 60; indanthrene-series organic pigments, such as C.I. Pigment Blue 60; quinophthalone-series organic pigments, such as C.I. Pigment Yellow 138; quinoxalinedione-series organic pigments, such as C.I. Pigment Yellow 213; metallic complex azo-series organic pigments, such as C.I. Pigment Yellow 129, and C.I. Pigment Yellow 150; phthalocyanine-series organic pigments, such as C.I. Pigment Green 7, C.I. Pigment Green 36, C.I. Pigment Green 37, C.I. Pigment Blue 16, C.I. Pigment Blue 75, and C.I. Pigment Blue 15 (including 15:1, 15:6, and others); triaryl carbonium-series organic pigments, such as C.I. Pigment Blue 56, and C.I. Pigment Blue 61; dioxazine-series organic pigments, such as C.I. Pigment Violet 23, and C.I. Pigment Violet 37; aminoanthraquinone-series organic pigments, such as C.I. Pigment Red 177; diketopyrrolopyrrole-series organic pigments, such as C.I. Pigment Red 254, C.I. Pigment Red 255, C.I. Pigment Red 264, C.I. Pigment Red 272, C.I. Pigment Orange 71, and C.I. Pigment Orange 73; naphthole AS-series organic pigments, such as C.I. Pigment Red 187, and C.I. Pigment Red 170; thioindigo-series organic pigments, such as C.I. Pigment Red 88; isoindoline-series organic pigments, such as C.I. Pigment Yellow 139, C.I. Pigment Orange 66; isoindolinone-series organic pigments, such as C.I. Pigment Yellow 109, C.I. Pigment Yellow 110, and C.I. Pigment Orange 61; pyranthrone-series organic pigments, such as C.I. Pigment Orange 40, and C.I. Pigment Red 216; and isoviolanthrone-series organic pigments, such as C.I. Pigment Violet 31.

The organic pigment that can be used in the dispersion of the present invention is preferably one selected from the group consisting of quinacridone-series organic pigments, diketopyrrolopyrrole-series organic pigments, mono azo yellow-series organic pigments, condensed azo-series organic pigments, quinophthalone-series organic pigments, benzimidazolone-series organic pigments, and disazo yellow-series organic pigments, more preferably one selected from the group consisting of quinacridone-series organic pigments, diketopyrrolopyrrole-series organic pigments, mono azo yellow-series organic pigments, and disazo yellow-series organic pigments.

In the dispersion of the present invention, a content of the water-insoluble colorant in the dispersion is not particularly limited. In consideration of application to an ink, for example, it is preferably from 0.01% by mass to 30% by mass, more preferably from 1.0% by mass to 20% by mass, and most preferably from 1.1% by mass to 15% by mass.

In the dispersion of the present invention, even though a concentration of the dispersion is high, a change of tint is small, and a viscosity of the dispersion is kept at a low level. For example, when the dispersion is applied to a recording liquid, a freedom degree of the kind and addition amount of additives that can be used in the recording liquid is increased. Accordingly, the water-insoluble colorant can be preferably used in the above content range.

Only one kind of water-insoluble colorant may be contained into the dispersion of the present invention, or, alternatively, two or more kinds of water-insoluble colorants may be concurrently contained into the dispersion. A combination of two or more kinds of water-insoluble colorant is not particularly limited. However, it is preferred to combine the same type of organic compounds such as a combination of azo-series organic pigments, or a combination of diketopyrrolopyrrole-series organic pigments. In other words, it is preferred to use a combination of organic pigments having a similar skeleton to each other. Specifically, there are preferable combinations such as C.I. pigment violet 19 and C.I. pigment red 122; C.I. pigment violet 19, C.I. pigment red 122 and C.I. pigment red 209; C.I. pigment yellow 128 and C.I. pigment yellow 74; and C.I. pigment yellow 128 and C.I. pigment orange 13. Conversion to solid solution of the pigment can be carried out, for example, with reference to JP-A-60-35055.

When at least two organic pigments are used in the dispersion as components, the dispersion preferably contains at least two organic pigments whose maximum absorption wavelengths ($\lambda$max) are different from each other by the range of 10 nm to 200 nm, and particularly preferably by the range of 10 nm to 100 nm. It should be noted that the absorption wavelength of a pigment as termed with respect to the present invention means the absorption wavelength in the particle state (i.e. the colorant is formed into particles), namely in the state of particles coated on or incorporated in a medium, and it does not mean an absorption wavelength in the solution state where the colorant is dissolved in a specific medium such as alkali or acid.

The maximum absorption wavelength ($\lambda$max) of an organic pigment contained as the major pigment component is not particularly limited, but it is practical in a coloring application to use organic pigment compounds having the maximum absorption wavelength within the visible light region. For example, it is preferred to use an organic pigment compound having the maximum absorption wavelength in the range of 300 nm to 750 nm.

The dispersion of the present invention is produced by dissolving a water-insoluble colorant into an aprotic water-soluble organic solvent in the presence of alkali, and making the solution of the water-insoluble colorant and an aqueous medium to contact each other, to give a dispersion in which fine particles of the water-insoluble colorant are generated. In this process, it is preferable that the polymer compound or surfactant having a structural unit represented by formula (I) is contained in the solution of the water-insoluble colorant and/or the aqueous medium. It is preferable to produce the dispersion as a dispersion containing build-up fine particles of the water-insoluble colorant and the polymer compound or surfactant in this manner.

The specific polymer compound or surfactant having a structural unit represented by formula (I) is mainly used to function as an improver of particle dispersibility of the water-insoluble colorant (i.e. as a dispersing agent). Alternatively, it may also be used to function as a particle-formation or particle-growth adjustor during generation of particles in the reprecipitation method. From this point, the addition amount of the above polymer compound or surfactant having a structural unit represented by formula (I) into the solution of the water-insoluble colorant and/or aqueous medium is preferably from 0.001 to 10,000 mass parts with respect to the water-insoluble colorant. It is more preferable to be from 0.05 to 1,000 mass parts, further preferable to be from 0.05 to 500 mass parts, and particularly preferable to be from 0.1 to 200 mass parts.

In the dispersion of the present invention, in addition to the above polymer compound or surfactant having a structural unit represented by formula (I), another polymer compound and/or low molecular weight compound may be concurrently used. With regard to the another polymer compound to be used, a polymer compound which is soluble into an aprotic organic solvent in the presence of alkali, and which exhibits, when a solution prepared by dissolving the water-insoluble colorant and the aforementioned dispersing agent and the aqueous medium are allowed to mix each other, the dispersion effect by forming particles containing the water-insoluble colorant in an aqueous medium is appropriately employable. Such the polymer compound is not particularly limited, and use can be made of, for example, polymer compounds having at least one kind of group selected from a carboxylic group, a sulfonic group and a phosphoric group as its hydrophilic part, and having the hydrophilic part and the hydrophobic part in the same molecule, and further being capable of achieving the object of the present invention. Preferably used are polymer compounds obtained by combining at least one monomer, as the hydrophobic part, selected from monomers represented by (meth)acrylic acid, maleic acid, itaconic acid, fumaric acid, β-CEA, styrene sulfonate, vinyl sulfonate, 4-vinylbenzene sulfonate, allyl sulfonate, 3-(meth)acryloyloxypropane sulfonate, 2-methylallyl sulfonate, 2-(meth)acryloyloxyethane sulfonate, 2-acrylamide-2-methylpropane sulfonate and salts of those, mono{2-(meth)acryloyloxy ethyl}acid phosphate, and 2-methacryloxyethyl phosphonate, together with at least one monomer selected from α-olefinic aromatic hydrocarbons having 8 to 20 carbon atoms such as styrene, 4-methylstyrene, 4-ethylstyrene, vinylnaphthalene, vinylnaphthalene derivatives; and vinylesters having 3 to 20 carbon atoms such as vinyl acetate and propionate vinyl; olefin carboxylic acid esters having 4 to 20 carbon atoms such as methyl methacrylate, ethyl methacrylate, propyl methacrylate, butyl methacrylate, benzyl methacrylate, 2-ethylhexyl methacrylate, stearyl methacrylate, methyl acrylate, ethyl acrylate, butyl acrylate, benzyl acrylate, 2-ethylhexyl acrylate, methyl crotonate, and ethyl crotonate; vinylic aromatic amines having 8 to 20 carbon atoms such as 4-vinylpyridine, and 4-vinyl aniline; vinylic amide compounds having 3 to 20 carbon atoms such as acrylamide, methacrylamide, and benzyl methacrylamide; olefin phenols having 8 to 20 carbon atoms such as 4-vinylphenol; and dienic compounds having 4 to 20 carbon atoms such as butadiene, and isoprene, in addition to those, polyfunctional monomers, macro-monomers, conventionally known monomers, and derivatives of these. Those other polymer compounds function as a dispersing agent, and only one kind of polymer compound may be used, or, alternatively, two or more kinds of polymer compounds may be used in combination.

The polymer compound having a structural unit represented by formula (I) and the polymer compound different from it preferably have a structural unit containing at least one kind of acid group as a hydrophilic unit. The acid group is preferably selected from a carboxylic acid group, a sulfonic acid group, and a phosphoric acid group. A polymer compound prepared by copolymerizing monomers having those acidic group salt and hydrophilic monomer components such as vinyl ethers and allyl ethers each having a polyether chain (e.g., polyoxyethylene alkylether, polyoxyethylene higher fatty acid ester, and polyoxyethylene alkyl phenyl ether) at those side-chains. Regarding with the polymerization method, there is no limitation, in particular, generally in any of radical polymerization, ionic polymerization, living polymerization, and coordinating polymerization; solutions as the medium; and measure such as bulk, emulsification. The radical polymerization with solution is preferable in the viewpoint of being convenient of manipulation.

The above polymer compound having a structural unit represented by formula (I) and the different polymer compound may be a copolymer which has any form of block-copolymer, random copolymer, or graft copolymer. Use of the block-copolymer, or graft copolymer is especially preferable since those copolymers readily impart a favorable dispersibility to a water-insoluble colorant.

In the polymer compound having a repeating unit represented by formula (I) and the polymer compound different from it, the ratio of the hydrophilic portion such as the acid group to the hydrophobic portion such as the ring structure group is not particularly limited, but it is preferable not to raise the rate of the hydrophobic monomer component excessively, for providing fine particles of the water-insoluble colorant with more favorable dispersion stability. Hydrophilicity is a property higher in affinity to water and thus more soluble in water, while hydrophobicity is a property lower in affinity to water and less soluble in water. When the hydrophilic portion of the dispersant consists only of groups other than those mentioned above, such as primary, secondary and tertiary amino groups and quaternary ammonium group, dispersion stability may become relatively lower, although sufficient, in aqueous organic pigment dispersions containing alkali. In the present invention, as described above, it is preferable to have the polymer compound or surfactant having a structural unit represented by formula (I) or the different polymer compound, functioning as a dispersant, together with the water-insoluble colorant, in a state dissolved in a medium, whereby the desired action between the dispersant and water-insoluble compound can be obtained and the contact efficiency to the fine particle surface is improved, and it is thus possible to use a variety of compounds as the dispersant.

For the purpose of further enhancing the stability of the dispersion of the present invention, yet another dispersing agent (e.g. a surfactant, a polymer dispersing agent) can be also added, in addition to the aforementioned ones. Specifically, such a surfactant may be properly selected from any of known surfactants and derivatives thereof, including anionic surfactants, such as alkylbenzene sulfonic acid salts, alkylnaphthalene sulfonic acid salts, higher-fatty acid salts, sulfonic acid salts of higher fatty acid esters, sulfuric acid ester salts of higher alcohol ether, sulfonic acid salts of higher alcohol ether, alkylcarboxylic acid salts of higher alkylsulfonamide, and alkylphosphoric acid salts; nonionic surfactants, such as polyoxyethylene alkyl ethers, polyoxyethylene-alkyl phenyl ethers, polyoxyethylene fatty acid esters, sorbitan fatty acid esters, ethyleneoxide adducts of acetylene glycol, ethyleneoxide adducts of glycerol, and polyoxyethylene sorbitan fatty acid esters; and in addition to the above, amphoteric surfactants, such as alkyl betaines and amido betaines; silicone-based surfactants, and fluorine-containing surfactants.

Specific examples of the polymer dispersing agent include polyvinyl pyrrolidone, polyvinyl alcohol, polyvinyl methyl ether, polyethylene oxide, polyethyleneglycol, polypropyleneglycol, and polyacrylamide. Among these, polyvinyl pyrrolidone is preferably used.

Further, as a polymer compound that can be used as yet another (polymer) dispersing agent, use can be preferably made of natural polymer compounds, such as albumin, gelatin, rosin, shellac, starch, gum Arabic, and sodium alginate; and their modified compounds. Further, these dispersing agents may be used singly, or in a combination of two or more. The amount of the other polymer compound and the surfactant is not particularly limited, but it is preferable, for example, to adjust the total amount in the favorable range of the polymer compound or surfactant having a structural unit represented by formula (I) described above.

In order to improve light resistance when the dispersion of the present invention is used as an ink that is described later, the above-described polymer compounds, surfactants, and/or dispersing agents can be preferably used. It is especially preferred to use a polymer dispersing agent or a polymer compound, each of which is soluble or dispersible in a particular organic solvent that is used for a cleaning treatment that is explained later, in consideration of providing light resistance and maintaining the dispersion at a low viscosity level even though the dispersion is concentrated.

Any kind of aprotic organic solvent may be used in the present invention, so long as the solvent is able to dissolve the water-insoluble colorant and the polymer compound. Aprotic organic solvents having 5% by mass or more of solubility to water are preferably used. Furthermore, aprotic organic solvents that can be freely mixed with water are preferable.

Specifically, examples of preferable solvents include dimethylsulfoxide, dimethylimidazolidinone, sulfolane, N-methyl pyrrolidone, dimethylformamide, N,N-dimethylacetoamide, acetonitrile, acetone, dioxane, tetramethylurea, hexamethylphosphoramide, hexamethylphosphoro triamide, pyridine, propionitrile, butanone, cyclohexanone, tetrahydrofuran, tetrahydro pyran, ethyleneglycol diacetate, and γ-butyrolactone. Of these solvents, dimethylsulfoxide, N-methyl pyrrolidone, dimethylformamide, N,N-dimethylacetoamide, dimethylimidazolidinone, sulfolane, acetone, acetonitrile, and tetrahydrofuran are preferable; and dimethylsulfoxide and N-methyl pyrrolidone are more preferable. Further, these solvents may be used singly or in combination of two or more.

A proportion of the aprotic solvent to be used is not particularly limited. However, it is preferred to use the solvent in the proportion of 2 parts by mass to 500 parts by mass, more preferably from 5 parts by mass to 100 parts by mass, with respect to 1 part by mass of the water-insoluble colorant respectively, in order to improve a dissolution state of the water-insoluble colorant, to easily form fine particles having a desired particle size, and to improve a color density of aqueous dispersion.

The alkali used for dissolving the water-insoluble colorant may be any one. Particularly, hydroxide of alkali metal, alkoxide of alkali metal, hydroxide of alkaline-earth metal, alkoxide of alkaline-earth metal, and organic strong base may preferably be used in terms of high solubilizing ability for the water-insoluble colorant. Examples thereof include inorganic bases such as sodium hydroxide, potassium hydroxide, cesium hydroxide, lithium hydroxide, magnesium hydroxide, calcium hydroxide, and barium hydroxide; trialkylamine, diazabicyclo undecene (DBU), sodium methoxide, tert-butoxy sodium, tert-butoxy potassium, quaternary ammonium compounds such as tetramethylammonium hydroxide, benzyltrimethylammonium hydroxide, chlorine hydroxide, and tetrabutylammonium hydroxide; and inorganic bases and organic bases such as guanidine, 1,8-diazabicyclo[5.4.0]-7-undecene, and 1,8-diazabicyclo[4,3,0]-7-nonene.

Especially, potassium hydroxide, sodium hydroxide, tetramethylammonium hydroxide, benzyltrimethylammonium hydroxide, chlorine hydroxide, and the quaternary ammonium compounds such as tetrabutylammonium hydroxide are preferable as the above alkalis.

Further, only one kind of alkali may be used, or, alternatively, two or more kinds of alkalis may be used in combination. An amount of use of the alkali is not particularly limited but the alkali may preferably be used in an amount of 0.1 to 10 mass parts, more preferably 0.5 to 5 mass parts, and further preferably 1 to 4 mass parts, per 1 mass part of the water-insoluble colorant.

In the present invention, the "aqueous medium" refers to water alone, or a mixed solvent of water and an organic solvent soluble in water. The addition of the organic solvent is preferably used, for example, (i) in the case where use of water only is not sufficient for uniformly dissolving a water-insoluble colorant and a dispersing agent, (ii) in the case where use of water only is not sufficient for obtaining viscosity required for the flow through a flow path, and the like. In the case of alkaline, for example, the organic solvent is preferably an amide series solvent or a sulfur-containing compound solvent, more preferably the sulfur-containing-compound solvent, and particularly preferably dimethylsulfoxide (DMSO). In the case of acidic, the organic solvent is preferably a carboxylic acid series solvent, a sulfur-containing compound solvent or a sulfonic acid series solvent, more preferably a sulfonic acid series solvent, and particularly preferably methanesulfonic acid. Additionally, an inorganic compound salt, a dispersing agent as described later or the like may be dissolved into the aqueous medium as required.

In this case, the embodiment wherein a solution of a water-insoluble colorant homogeneously dissolved therein and an aqueous medium are mixed is not particularly limited. Examples of the embodiment include an embodiment in which a water-insoluble colorant solution is added to an aqueous medium with being stirred, and an embodiment in which a water-insoluble colorant solution and an aqueous medium are each delivered to a certain length of flow path in the same longitudinal direction, and both the solution and the medium are allowed to contact with each other in the course of getting through the flow path, thereby to deposit fine particles of the water-insoluble colorant. With respect to the former (the embodiment of stirring and mixing), it is especially preferred to use an embodiment in which a feed pipe or the like is introduced in an aqueous medium so that a water-insoluble colorant solution is fed from the pipe for addition in liquid. More specifically, the addition in liquid can be performed by using an apparatus described in International Publication WO 2006/121018 pamphlet, paragraph Nos. 0036 to 0047. With respect to the latter (the embodiment of mixing both the liquid and the solvent by using flow path), there can be used micro reactors described in JP-A-2005-307154, paragraph Nos. 0049 to 0052 and FIGS. 1 to 4, and JP-A-2007-39643, paragraph Nos. 0044 to 0050.

In the present invention, a gas, such as the air or oxygen, may coexist at the time of formation of particles. For example, the gas may be used as an oxidant. The embodiment of making the gas coexists is not particularly limited. For example, the gas may be dissolved in a liquid of the water-insoluble colorant and/or an aqueous medium in advance. Alternatively, the gas may be introduced into another medium different from these liquid and medium, and followed by contacting said another medium with these liquid and medium to introduce thereinto.

In the preparation of the dispersion of the present invention, it is preferable to introduce a heating step. Regarding the significance of introducing the heating step, there are the effects described in Japanese Patent No. 3936558 and being representative by so-called Ostwald ripening. It is preferable that the above heating is carried out at from 30° C. to 110° C., and that the heating time is from 10 to 360 minutes. It is also preferable that the heating treatment is carried out after allowing the water-insoluble colorant solution and the aqueous medium to mix each other to obtain the dispersion among which the fine particles are dispersed.

A condition for deposition and formation of the particles of the water-insoluble colorant is not particularly limited, and can be selected from a range from a normal pressure condition to a subcritical or supercritical condition. The temperature at which the particles are prepared under normal pressure is preferably −30 to 100° C., more preferably −10 to 60° C., and particularly preferably 0 to 30° C. A mixing ratio of the water-insoluble colorant solution to the aqueous medium is preferably 1/50 to 2/3, more preferably 1/40 to 1/2, and particularly preferably 1/20 to 3/8 in volume ratio. The concentration of the particles of the water-insoluble colorant in the mixed liquid at the time of deposition of the particles is not particularly limited, but the amount of the particles of the water-insoluble colorant is preferably 10 to 40,000 mg, more preferably 20 to 30,000 mg, and particularly preferably 50 to 25,000 mg, per 1,000 ml of the solvent.

[Average Particle Diameter from Observation by Electron Microscope (TEM Average Particle Diameter)]

In the present invention, a shape of the water-insoluble colorant particles that are contained in the dispersion is observed by using a scanning electron microscopy (SEM) or a transmission electron microscope (TEM), to calculate an average particle diameter thereof as described below. In the case of using the TEM, the dispersion (dispersion liquid) containing fine particles of water-insoluble colorant is diluted. The diluted dispersion is dropped onto a Cu 200 mesh to which a carbon film is attached, and then the fine particles are dried on the mesh. The diameter of each of 300 particles is measured from images of the particles photographed to 100,000 times using TEM (1200EX, manufactured by JEOL Ltd.), and then an average particle diameter is calculated. At this time, because the dispersion is dried on the Cu 200 mesh as described above, even the water-insoluble colorant is in a state well dispersed in the dispersion, there is a case where particles of the water-insoluble colorant apparently aggregate during the dry step, which makes it difficult to discriminate an accurate particle size. In this case, an average particle diameter is calculated by using isolated 300 particles that are not piled on other particles. When the particles of the water-insoluble colorant are not spherical, the width of the particle major axis (the longest size of the particle) is measured.

The average particle size of the water-insoluble colorant that is calculated from observation by using the transmission electron microscope (TEM) is preferably from 5 nm to 50 nm, and more preferably from 5 nm to 45 nm. It is especially preferable that the average particle size is from 5 nm to 40 nm. When the average particle size is too small, it is sometimes difficult to keep a stable dispersion state in the dispersion for a long time, or it is sometimes difficult to obtain excellent resistance to light. On the other hand, when the average particle size is too large, it is sometimes difficult to obtain good transparency of the dispersion. It is thus preferable to make the particle diameter fall in the range above, for providing a dispersion satisfying the requirements in transparency, dispersion stability, and light resistance simultaneously at high level.

In the present invention, the fine particles of the water-insoluble colorant may consist of only the water-insoluble colorant such as a pigment, or may contain other compound than the water-insoluble colorant, for example, the polymer compound having a structural unit represented by formula (I). At this time, the particles of the water-insoluble colorant may be composed of a solid solution of two or more kinds of pigments. However, a mixture of a portion having a crystalline structure and another portion having a non-crystalline structure may be present in the particle. Further, the water-insoluble colorant and/or other compound may constitute the particle cores, and the above dispersing agent (polymer compound, surfactant or the like) may adhere so as to cover the cores, to form fine particles.

The water-insoluble colorant that is used in the present invention may be contained in resin fine particles or inorganic fine particles. At this time, it is preferable that the resin fine particles and inorganic fine particles are a non-colored component in order not to degrade a tint of the water-insoluble colorant. An average particle size of the resin fine particles or the inorganic fine particles is preferably from 6 nm to 200 nm. When the dispersion of the water-insoluble colorant is used as an inkjet recording liquid, the average particle size is more preferably from 6 nm to 150 nm, and especially preferably from 6 nm to 100 nm, from a viewpoint of obtaining excellent discharge (emission) stability.

[Average Particle Diameter According to a Dynamic Light-Scattering Method]

In the present invention, a dispersion state of the water-insoluble colorant may be also evaluated according to a dynamic light-scattering method. Thereby, an average particle diameter of the water-insoluble colorant can be calculated. The principle of evaluation is detailed below. Particles with the size ranging from about 1 nm to about 5 μm are momentarily changing their position and direction in Brownian motion such as translation and rotation. Accordingly, by irradiating a laser light to these particles and then detecting the resultant scattered light, fluctuation of the scattered light intensity depending on Brownian motion is observed. By observing the fluctuation of the scattered light intensity with respect to time, a speed (diffusion coefficient) of the particles in Brownian motion is calculated, and the size of the particles can be known.

Applying the above principle, an average particle diameter of the water-insoluble colorant is measured. When the measured value is similar to the average particle diameter that is obtained from the electron microscope observation, in particular TEM observation, it means that the particles in a liquid are in mono dispersion (the situation in which particles are neither bonding nor aggregating to each other). Namely, particles are each dispersed in a dispersion medium with keeping an interval between particles, so that they can move singly and independently.

In the present invention, it is preferable that the arithmetic average particle diameter of the water-insoluble colorant in a dispersion medium measured in accordance with the dynamic light-scattering method is almost the same level as the average particle diameter obtained from TEM observation. In other words, it is preferable that a mono dispersion of the water-insoluble colorant fine particles in a dispersion medium can be attained. The arithmetic average particle size of the water-insoluble colorant in the dispersion medium according to the dynamic light-scattering method is preferably 50 nm or less, and more preferably 45 nm or less, and especially preferably 40 nm or less. In the present invention, unless indicated otherwise, the simply described "average particle diameter" means the average particle diameter measured by TEM.

Further, it is preferable that a particle diameter distribution of the water-insoluble colorant dispersed in a dispersion medium in the present invention is monodispersion. Monodisperse particles are advantageous because adverse influence owing to light-scatting at large-sized particles can be reduced. In addition, when aggregate is formed by using the dispersion at printing, recording, or the like, the mono dispersion has advantages to control of a filling form of the formed aggregate or the like. As an indicator that is used to evaluate dispersity of the dispersion, for example, there can be used a difference between the diameter (D90) of particles that occupy 90% by number and the diameter (D10) of particles that occupy 10% by number of the total particle numbers, in the following integral equation of the particle diameter distribution function with respect to the arithmetic average particle diameter that is obtained according to the dynamic light-scattering method:

$$dG=f(D) \times d(D)$$

wherein G represents the number of particles; and D represents a primary particle diameter.

In the present invention, the above difference between the particle diameter (D90) and the particle diameter (D10) is preferably 45 nm or less, and more preferably from 1 nm to 30 nm, and especially preferably from 1 nm to 20 nm. It should be noted that the above method can be suitably used in the particle diameter distribution curve that is prepared by using the particle diameter that is obtained from observation by using the above-described electron microscope.

Further, as another indicator that is used to evaluate dispersity, there can be also used a ratio of a volume average particle diameter (Mv) to a number average particle diameter (Mn), namely a ratio of (Mv)/(Mn). Both Mv and Mn are obtained by the dynamic light-scattering method. In the dispersion of the present invention, the aforementioned ratio (Mv)/(Mn) is preferably 1.7 or less, and more preferably 1.6 or less, and still more preferably 1.5 or less.

In the dispersion of the present invention, fine particles of the water-insoluble colorant are dispersed in a medium containing water. In one embodiment, when a peak intensity of light absorbance in the visible light wavelength region (for example, about 380 nm to about 700 nm) is 1, the light-scattering intensity is preferably 30,000 cps or less. This means that even though the particles contain the water-insoluble colorant in such an amount that a peak intensity of light absorbance in the visible light wavelength region becomes 1, the light-scattering intensity is as low as 30,000 cps or less. When the light-scattering intensity is low, high transparency can be recognized in the above dispersion, or a recording liquid in which the dispersion is used.

In the present invention, it is preferable to use a dispersion containing water, fine particles of a water-insoluble colorant and the specific polymer compound or surfactant, as described above, aggregate the fine particles of the water-insoluble colorant into redispersible agglomerates (flock or soft aggregates), and separate the agglomerates from the medium. It is further preferable to impart the agglomerates redispersibility and release (deaggregate) the particles from the aggregated condition so as to be dispersed into a redispersion medium. Accordingly, it is possible to replace the dispersion medium to another dispersion medium. For example, it is possible, by using a medium containing a particular component as the redispersion medium, to impart the dispersion after redispersion with properties improving ink properties. In particular, the polymer compound or surfactant having a structural unit represented by formula (I) shows its effect at the time of this dispersion medium replacement. Including some presumption, it is considered that the specific ring structure group interacts with the water-insoluble colorant molecule so as to make a special adsorption state. Accordingly, the specific polymer compound or surfactant suitably remains on the particle surface or in the particles without being released therefrom, and provides the ink compositions containing a hydrophobic organic solvent described later with favorable dispersion stability.

The step of aggregating the particles of the water-insoluble colorant into redispersible agglomerates and separating the agglomerates from the medium and the step of redispersing the aggregates (agglomerates) by releasing the particles from the aggregation state, in the method of producing the dispersion according to the present invention will be described in detail.

It is preferred that a mixture having particles of the water-insoluble colorant generated is subjected to an acid treatment as specifically described below. Preferably, in the acid treatment, the acid is added during formation of aggregate, to form aggregate of particles. The acid-using treatment preferably includes steps of aggregation of pigment particles with an acid, separation of the resultant aggregate from a solvent (dispersing medium), concentration, solvent removal and desalting (deacidification). By making a system acidic, it enables to reduce electrostatic repulsion of particles owing to a hydrophilic portion of the acid group, and to aggregate the particles.

As the acid that is used in the aggregation of particles, any acid may be used so long as the compound is able to make hardly precipitating fine-particles in the aqueous dispersion aggregate in a form such as slurry, paste, powder-like, granular, cake-like (bulk), sheet-like, short (discontinuous) fiber-like or flake-like form, and able to efficiently separate the resultant aggregate from a solvent according to an ordinary separation method. As the acid, it is more preferred to use an acid that forms a water-soluble salt with alkali. It is more preferable that the acid itself has a high solubility to water. In order to conduct desalting as efficiently as possible, it is preferable that the amount of acid used is as small as possible so long as the particles aggregate in the amount of the acid. Examples of the acid include hydrochloric acid, sulfuric acid, nitric acid, acetic acid, phosphoric acid, trifluoroacetic acid, dichloroacetic acid, and methane sulfonic acid. Of these acids, hydrochloric acid, acetic acid, and sulfuric acid are particularly preferable. An aqueous dispersion of colorant particles that has been processed with the acid so as to be easily separable can be easily separated by using a centrifugal separator, a filter, a slurry liquid-solid separator or the like. At this time, a degree of desalting or solvent removal can be controlled by adding diluent water, or by increasing frequency of decantation and washing. Regarding with the aggregation method, inorganic compounds such as alum or so and polymer aggregation agents may be used in combination.

The thus-obtained aggregate can be used as a paste or slurry as it is, each of which has high water content. If necessary, it is also possible to use fine powder that is obtained by drying the paste or slurry according to a drying method such as a spray-dry method, centrifugal separation drying method, a filter drying method, or a freeze-drying method.

As the re-dispersion treatment, there can be exemplified an alkali treatment. Namely, it is preferred to neutralize the particles aggregated with using the acid, with alkali, and then to re-disperse the particles into water or the like with maintaining a primary particle diameter at the time of deposition of the particles. Since desalting and solvent removal have been already conducted, a concentrated-base of aqueous dispersion containing a little impurity can be obtained. As the alkali used herein, any alkali can be used, so long as they act as a neutralizing agent for a dispersing agent having an acidic hydrophilic portion and enhance solubility to water. Specific examples of the alkali include various kinds of organic amines such as aminomethylpropanol, dimethylaminopropanol, dimethylethanolamine, ditehyltriamine, monoethanolamine, diethanolamine, triethanolamine, butyldiethanolamine, and morpholine; alkali metal hydroxides such as sodium hydroxide, lithium hydroxide, and potassium hydroxide; and ammonia. They may be used solely or in a combination of two or more compounds.

The amount of the alkali used is not particularly limited, and is within the range in which the aggregated particles can be re-dispersed stably in water. However, when the dispersion is used for end use such as a printing ink or inkjet printer ink, the alkali sometimes causes corrosion of various kinds of parts. Therefore, it is preferred to use the alkali in such an amount that pH is within the range of 6 to 12, and more preferably from 7 to 11.

Further, in accordance with the dispersing agent that is used in the time of deposition of particles, a method different from the above alkali treatment may be used. Examples of the method include a re-dispersion treatment using a low molecular dispersing agent or polymer dispersing agent described above. At this time, means for a dispersion treatment that are known from the past may be used. For example, it is possible to use a dispersing machine such as sand mill, bead mill, ball mill, and dissolver, or an ultrasonic treatment. These re-dispersion treatments may be used in combination with the above alkali treatment.

When the aggregated particles are re-dispersed, re-dispersion can be easily performed by adding a water-soluble organic solvent as a medium for the re-dispersion. The organic solvent usable is not particularly limited. Specific examples of the organic solvent include lower alcohols such as methanol, ethanol, n-propanol, isopropanol, n-butanol, isobutanol, and tert-butanol; aliphatic ketones such as acetone, methylethylketone, methylisobutylketone, and diacetone alcohol; ethylene glycol, diethylene glycol, triethylene glycol, glycerol, propylene glycol, ethylene glycol monomethyl or monoethyl ether, propylene glycol monomethyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, N-methylpyrrolidone, 2-pyrrolidone, N,N-dimethylformamide, dimethylimidazolidinone, dimethylsulfoxide, and N,N-dimethylacetoamide. These solvents may be used singly or in a combination of two or more compounds. When colorant particles are re-dispersed to prepare an aqueous dispersion thereof, the water content is preferably in the range of 99 to 20% by mass and, more preferably from 95 to 30% by mass of the aqueous dispersion respectively. The content of the water-soluble organic solvent is preferably in the range of 50 to 0.1% by mass and, more preferably from 30 to 0.05% by mass of the aqueous dispersion respectively.

When water, the above-described alkali and water-soluble organic solvent are added to the aggregated particles, if necessary, a stirrer, a mixer, a dispersing machine (such as a sand mill, a beads mill, a ball mill, a dissolver) or a ultrasonic dispersing machine may be used. When a paste or slurry of a water-insoluble colorant which is high in water content is used, addition of water is unnecessary. Further, heating, cooling, distillation or the like may be conducted for the purpose of enhancing efficiency of re-dispersion and another purpose of removing unnecessary water-soluble organic solvent, or an excessive alkali or the like.

The method of preparing the recording liquid (hereinafter, also referred to as "ink composition") according to the present invention is not particularly limited, and, it may be prepared, for example, by mixing components such as a specific polymer compound, surfactant, and aqueous solvent, so as to be uniformly dissolved or dispersed, during aggregating the dispersion according to the present invention into the soft aggregation and subsequent redispersion, as described above.

It is preferable that the recording liquid of the present invention contains the above water-insoluble colorant in an amount of 0.1% by mass to 15% by mass of the recording liquid. When an excessive amount of polymer compounds or other additives are contained in the prepared ink, these materials may be properly removed according to a method such as centrifugal separation and dialysis, thereby to re-prepare the ink composition. The recording liquid of the present invention may be used alone. Alternatively, the recording liquid may be combined with another ink to prepare an ink set of the present invention.

A water-soluble solvent is preferably used as a component for the ink composition, specifically as an anti-drying agent, a wetting agent, or a penetration-accelerating agent. In particular, in the case of an aqueous ink composition for use in the ink jet recording system, a water-soluble organic solvent is preferably used as an anti-drying agent, a wetting agent, or a penetration-accelerating agent. An anti-drying agent or a wetting agent is used for prevention of clogging of nozzle due to inkjet ink dried in the ink-ejecting opening of the nozzle. A water-soluble organic solvent having a vapor pressure lower than water is preferable as the anti-drying agent or the wetting agent. Further, a water-soluble organic solvent is preferably used as a penetration-accelerating agent for better penetration of the ink composition (in particular, inkjet ink composition) into paper.

In the present invention, the above-mentioned water-soluble solvent (a) preferably contains a hydrophobic solvent (preferably hydrophobic organic solvent) having a SP value of 27.5 or less in an amount of 90% by mass or more and a compound represented by the following formula (VI), for the purpose of prevention of curling. The component of the "water-soluble solvent having a SP value of 27.5 or less" and the "compound represented by formula (VI)" may be identical with each other.

The solubility parameter (SP value) of the water-soluble solvent according to the present invention is a value defined as the square root of the molecule aggregation energy, and can be determined by the method described in R. F. Fedors, Polymer Engineering Science, 14, p. 147 (1967), and the value is used in the present invention.

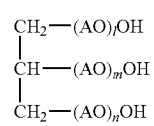

Formula (VI)

In formula (VI), l, m, and n each independently represent an integer of 1 or more, and l+m+n=3 to 15. A too-small l+m+n value leads to low curling resistance, while a too-large value leads to deterioration in ejection efficiency. In particular, the value l+m+n is preferably 3 to 12, more preferably 3 to 10. In formula (VI), AO represents an ethyleneoxy group or a propyleneoxy group, and a propyleneoxy group is particularly preferable. The AOs in the $(AO)_l$, $(AO)_m$, and $(AO)_n$ may be the same as or different from each other.

Hereinafter, examples of the water-soluble solvents having an SP value of 27.5 or less and the compounds represented by formula (VI) will be listed respectively with SP values (in parenthesis). However, the present invention is not limited to these examples.

Diethylene glycol monoethyl ether (22.4)
Diethylene glycol monobuthyl ether (21.5)
Triethylene glycol monobuthyl ether (21.1)

Dipropylene glycol monomethyl ether (21.3)
Dipropylene glycol (27.2)

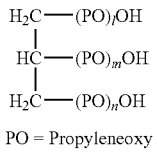

(VI-1)

PO = Propyleneoxy l + m + n = 3 (26.4)

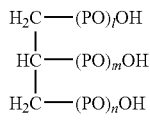

(VI-2)

PO = Propyleneoxy l + m + n = 4 (24.9)

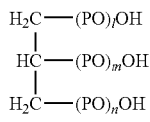

(VI-3)

PO = Propyleneoxy l + m + n = 5 (23.9)

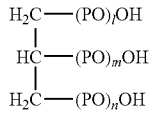

(VI-4)

PO = Propyleneoxy l + m + n = 6 (23.2)

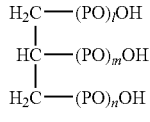

(VI-5)

PO = Propyleneoxy l + m + n = 7 (22.6)

$nC_4H_9O(AO)_4$—H (AO is EU or PO, the ratio of EO:PO=1:1) (20.1)

$nC_4H_9O(AO)_{10}$—H (AO is EO or PO, the ratio of EO:PO=1:1) (18.8)

$HO(A'O)_{40}$—H (NO is EO or PO, the ratio of EO:PO=1:3) (18.7)

$HO(A''O)_{55}$—H (A"O is EO or PO, the ratio of EO:PO=5:6) (18.8)

$HO(PO)_3$—H (24.7)

$HO(PO)_7$—H (21.2)

1,2-hexanediol (27.4)

In the present invention, EO and PO represent an ethyleneoxy group and a propyleneoxy group, respectively.

The rate (content) of the compound represented by formula (VI) in the water-soluble solvent (a) is preferably 10% or more, more preferably, 30% or more, and still more preferably 50% or more. There is no particular problem generated, if the value is higher. The above range is preferable, since a value in the range above enables further improvement of both in ink stability and ejection efficiency and favorable prevention of curling.

Also in the present invention, another solvent may be used in combination, to an extent that the ratio of the solvent having a SP value of 27.5 or less is not less than 90%.

Examples of the water-soluble organic solvent usable in combination include polyvalent alcohols including glycerol, 1,2,6-hexanetriol, trimethylolpropane and alkanediols such as ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; sugars such as glucose, mannose, fructose, ribose, xylose, arabinose, galactose, aldonic acid, glucitol, (sorbit), maltose, cellobiose, lactose, sucrose, trehalose and maltotriose; sugar alcohols; hyaluronic acids; so-called solid wetting agents such as urea compounds; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethylsulfoxide, sorbit, sorbitan, acetin, diacetin, triacetin, sulfolane, and the like, and these solvents may be used alone or in combination of two or more.

A polyvalent alcohol is useful as the anti-drying or wetting agent, and examples thereof include glycerol, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, and the like. These alcohols may be used alone or in combination of two or more.

A polyol compound is favorable as the penetrant, and examples of the aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol and the like. In particular, 2-ethyl-1,3-hexanediol and 2,2,4-trimethyl-1,3-pentanediol can be mentioned as favorable examples.

The water-soluble solvent (a) for use in the recording liquid according to the present invention may be used alone or in combination of two or more. The content of the water-soluble solvent in the entire ink composition is preferably 1 mass % or more and 60 mass % or less, more preferably 5 mass % or more and 40 mass % or less, and particularly preferably 10 mass % or more and 30 mass % or less, for assurance of stability and ejection reliability.

The amount of water (c) added to the recording liquid according to the present invention is not particularly limited, but, preferably 10 mass % or more and 99 mass % or less, more preferably 30 mass % or more and 80 mass % or less, and still more preferably 50 mass % or more and 70 mass % or less, in the entire ink composition, for assurance of stability and ejection reliability.

The recording liquid of the present invention may be used in various image-forming methods and apparatuses, such as a variety of printing methods, inkjet process, and electrophotography. Imaging can be performed according to an image-forming method using the apparatuses. Further, according to the inkjet process, fine patterns may be formed, or dosage of drugs may be conducted.

It is preferable that the recording liquid of the present invention is used as an inkjet recording liquid. It is also preferred to prepare an ink set using the inkjet recording liquid. It is also preferred to prepare a printed article having an image recorded by use of the recording liquid or the ink set of the present invention, with a provider that has a function to provide the recording liquid to a recording medium. It is more preferred to prepare a printed article having an image with a shading nuance adjusted by a provider that has a function to adjust an applying amount or concentration of the recording liquid. It is also preferable that the recording liquid or ink set is used in an image-forming method that includes a process of recording an image by providing the recording liquid to a recording medium (material). Further, according to the present invention, it is also possible to produce an image-forming apparatus having the means for recording an image by using the above recording liquid or ink set and providing the recording liquid to a recording medium.

The dispersion of the present invention having excellent performance can realize an image recording of high quality and high vividness when the dispersion is used as ink. In addition, it can be suitably used as a material for forming color filters.

The present invention will be described in more detail based on the following examples, but the invention is not intended to be limited thereto.

EXAMPLES

In the following examples, the terms "part(s)" and "%" are values by mass, unless otherwise specified. Average particle size of each of the dispersions according to the dynamic scattering method was measured by using LB-500 (trade name, manufactured by HORIBA, Ltd.) after dilution with ion-exchanged water. At this time, inputting 1.600 as the volume refractive index, and also inputting 1.333 as the refractive index of ion-exchange water as the dispersion medium, a volume-average particle size My of each of the dispersions, and a number-average particle size Mn thereof were measured. Further, evaluation of the average particle diameter from observation with the transmission electron microscope (TEM) was conducted by adding dropwise a diluted dispersion onto a Cu 200 mesh to which a carbon film was attached, and then drying, and thereafter measuring the major axis of each of 300 particles that were isolated and not piled up each other, from images of the particles photographed to 100,000 times using TEM (1200EX, manufactured by JEOL Ltd.), and then calculating an average value as an average particle diameter. Hereinafter, the average particle diameter calculated from TEM observation is described as a TEM average particle diameter.

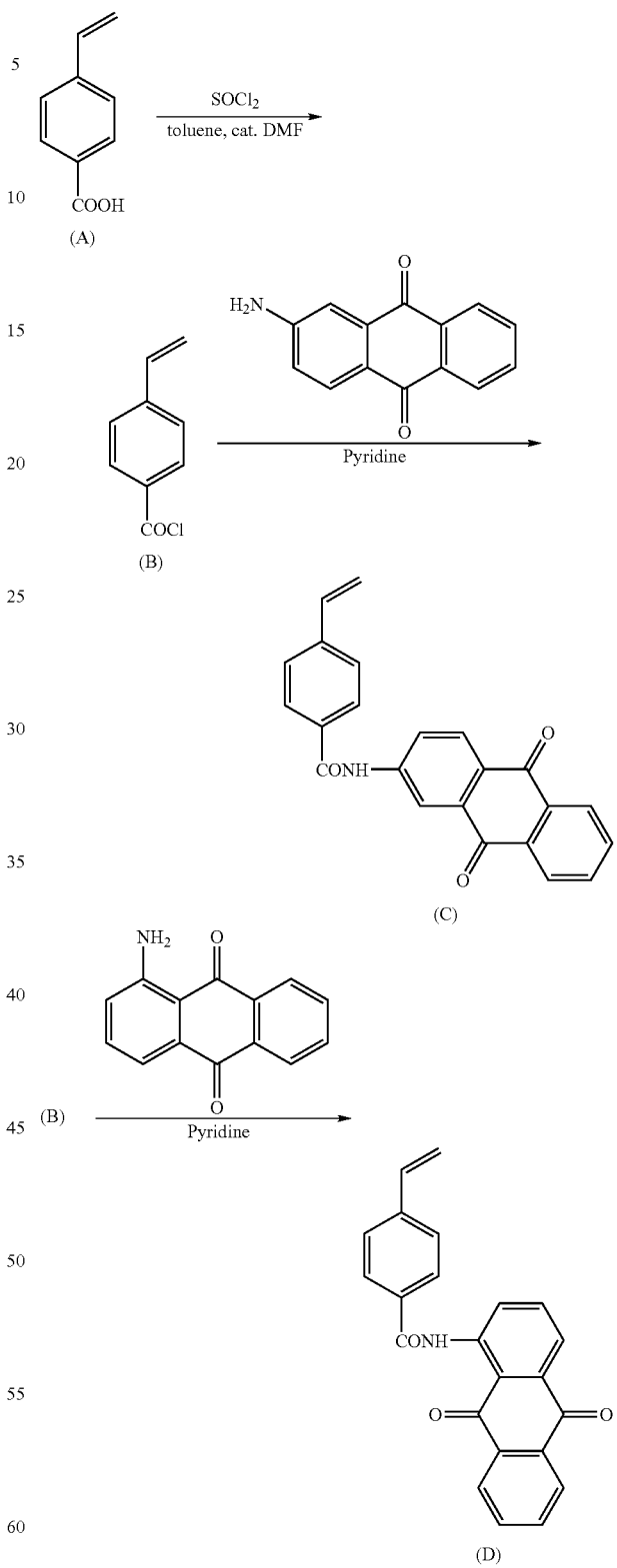

Synthesis of Monomer (C)

To a 200-ml three-neck flask, 16.6 g (0.112 mol) of 4-vinylbenzoic acid, 80 ml of toluene, and two drops of N,N-dimethylformamide were added. While stirring the mixture under room temperature, 9.7 ml (0.14 mol) of thionyl chloride was added to the mixture, followed by stirring the resultant under heating at 60° C. for 2 hours. Then, inside the system was cooled down to around 40° C., and the toluene and the excess thionyl chloride were removed under the reduced pressure, to obtain Compound (B). Without refining compound (B) further, it was used in the next reaction immediately.

To a 500-ml three-neck flask, 22.5 g (0.101 mol) of 2-aminoanthraquinone and 110 ml of pyridine were added. While stirring the resultant under cooling by ice, the above compound (B) was dropped down slowly through a dropping funnel. After stirring the resultant under cooling by ice for 30 minutes, it was further stirred under heating at 60° C. for 3 hours. Then, it was cooled down to the room temperature, and while stirring the resultant reaction mixture, water was added thereto. The thus-generated crude crystals were separated by filtration, and then washed by pouring water and methanol. Subsequently, the collected crude crystals were entered into a 500-ml three-neck flask, and added with 500 ml of methanol, and the resultant mixture was stirred under heating at 60° C. Afterwards, the crystals were separated by filtration, washed by methanol, and dried, to obtain 21.5 g of Compound (C). (Yield: 75%) The results of NMR measurement of the compound (C) are shown below.

$^1$H-NMR (300 MHz, CDCl$_3$) δ=5.48 (br.d, 1H, J=12.0 Hz), 6.07 (br.d, 1H, J=17.4 Hz), 6.89 (br.dd, 1H, J=12.0, 17.4 Hz), 7.78 (br.d, 2H, J=8.4 Hz), 7.94-8.05 (m, 4H), 8.08 (br.d, 2H, J=8.4 Hz), 8.19-8.24 (m, 1H), 8.29-8.34 (m, 1H), 9.19 (dd, 1H, J=1.5, 6.9 Hz), 13.1 (br.s, 1H).

Synthesis of Monomer (D)

In the same manner as the synthesis of monomer (C) described above, monomer (D) was prepared using 22.5 g (0.101 mol) of 1-aminoanthraquinone, and thereby obtained 20.2 g of Monomer (D) (yield: 71%). The results of NMR measurement of the compound (D) are shown below.

$^1$H-NMR (300 MHz, CDCl$_3$) δ=5.46 (br.d, 1H, J=12.0 Hz), 6.04 (br.d, 1H, J=17.7 Hz), 6.92 (br.dd, 1H, J=12.0, 17.7 Hz), 7.72 (br.d, 2H, J=9.0 Hz), 7.92-8.03 (m, 2H), 8.14 (br.d, 2H, J=9.0 Hz), 8.34 (br.d, 2H, J=9.0 Hz), 8.49 (br.d, 2H, J=9.0 Hz), 8.80 (br.d, 2H, J=9.0 Hz), 10.1 (br.s, 1H).

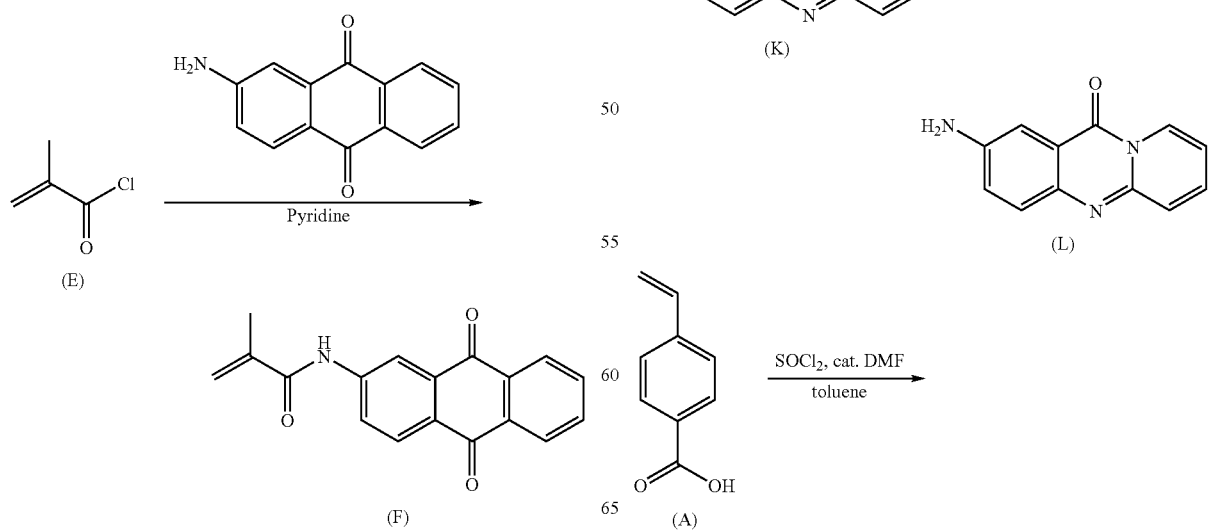

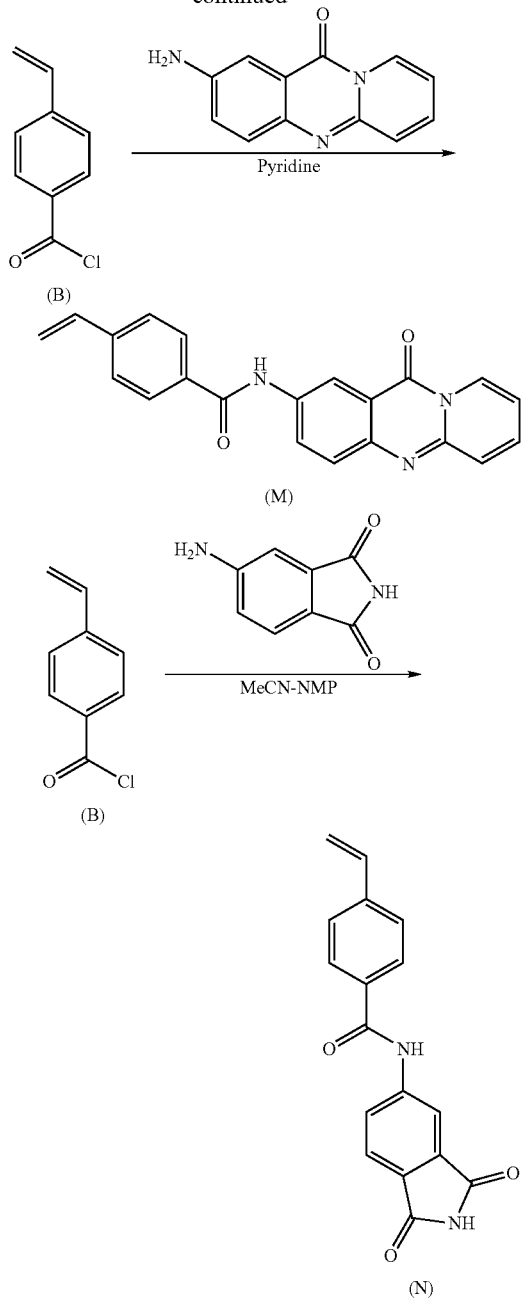

Synthesis of Monomer (F)

In the same manner as the synthesis of monomer (C) described above, monomer (F) was prepared using 22.5 g (0.101 mol) of 2-aminoanthraquinone and 11.6 g (0.111 mol) of methacryloyl chloride, and thereby obtained 15.3 g of Monomer (F) (yield: 52%). The results of NMR measurement of the compound (F) are shown below.

300 MHz in CDCl₃

δ=2.12 (s, 3H), 5.58 (s, 1H), 5.91 (s, 1H), 7.74-7.84 (m, 3H), 8.16-8.42 (m, 5H).

Synthesis of Monomer (H)

In the same manner as the synthesis of monomer (C) described above, monomer (H) was prepared using 22.5 g (0.101 mol) of 2-aminoanthraquinone and 16.4 g (0.106 mol) of Karenz MOI (trade name, manufactured by SHOWA DENKO K.K.), and thereby obtained 25.9 g of Monomer (H) (yield: 68%). The results of NMR measurement of the compound (H) are shown below.

300 MHz in DMSO-d6

δ=1.90 (s, 3H), 3.45 (br.q, 2H, J=5.7 Hz), 4.18 (br.t, 2H, J=5.7 Hz), 5.71 (s, 1H), 6.09 (s, 1H), 6.54-6.62 (m, 1H), 7.84-7.95 (m, 3H), 8.11 (br.d, 1H, J=11.4Hz), 8.16-8.22 (m, 2H), 8.28-8.32 (m, 2H), 9.46 (br.2, 1H).

Synthesis of Monomer (M)

To a 1-L three-necked flask, 80.6 g (0.40 mol) of 2-chloro-4-nitrobenzoic acid, 75.2 g (0.80 mol) of 2-aminopyridine, 2.0 g (0.031 mol) of copper powder, 27.6 g (0.200 mol) of potassium carbonate, and 250 ml of dimethylformamide were placed and stirred under heat at 160° C. for 6 hours. The mixture was then cooled to room temperature and left overnight. Water and acetone were added to the reaction mixture, and the resultant crystals were collected by filtration. The crystals were washed with water and acetone and dried, to obtain 42 g of Compound (K) (yield: 44%).

To a 2-L three-necked flask, 20 g (0.36 mol) of reduced iron, 2.0 g (0.037 mol) of ammonium chloride, 4 ml of water, and 200 ml of 2-propanol were placed. While the mixture was heated under reflux, 2 ml of acetic acid was added thereto. The mixture was heated under reflux additionally for 5 minutes, and 20.0 g (0.083 mol) of Compound (K) was added gradually in portions. After heating under reflux additionally for about 1 hour, 15 ml of 2-propanol was added thereto. The reaction mixture was filtered through Celite for removal of the inorganic salts formed. The filtrate was concentrated in a rotary evaporator, and the residue was poured into ice water, to give 7.2 g of Compound (L) (yield: 42%). (In the scheme, AcOH represents acetic acid; and IPA represents 2-propanol).

Separately, 6.3 g (yield: 55%) of Monomer (M) was obtained from 7.0 g (0.034 mol) of compound (L), in the same manner as the synthesis of Monomer (C).

The results of NMR measurement of the compound (K) are shown below.

300 MHz in DMSO-d6

δ=7.22-7.28 (m, 1H), 7.67 (br.d, 1H, J=9.0 Hz), 7.87 (d, 1H, J=9.3 Hz), 7.91-7.98 (m, 1H), 8.58 (dd, 1H, J=3.3, 9.3 Hz), 8.87-8.93 (m, 1H), 9.04 (d, 1H, 3.3 Hz)

The results of NMR measurement of the compound (L) are shown below.

300 MHz in DMSO-d6

δ=5.74 (br.s, 2H), 6.84-6.88 (m, 1H), 7.28 (br.dd, 1H, J=2.4, 8.4 Hz), 7.32-7.42 (m, 2H), 7.44-7.56 (m, 2H), 8.69 (br.d, 1H, J=7.5 Hz),

The results of NMR measurement of the compound (M) are shown below.

300 MHz in DMSO-d6

δ=5.61 (d, 1H, J=11.4 Hz), 6.21 (d, 1H, J=18 Hz), 7.03 (dd, 1H, J=11.4, 18 Hz), 7.24 (br.t, 1H, J=6.6 Hz), 7.70 (br.d, 1H, J=8.7 Hz), 7.85 (d, 2H, J=8.4 Hz), 7.82-7.91 (m, 1H), 7.97 (d, 1H, J=9.3 Hz), 8.20 (d, 2H, J=8.4 Hz), 8.48 (br.dd, 1H, J=2.7, 8.7 Hz), 8.99 (br.d, 1H, J=7.2 Hz), 9.06 (br.d, 1H, J=2.4 Hz), 10.80 (s, 1H).

Synthesis of Monomer (N)

To a 200-ml three-neck flask, 9.1 g (0.061 mol) of 4-vinylbenzoic acid, 45 ml of toluene, and two drops of N,N-dimethylformamide were added. While stirring the mixture under room temperature, 4.7 ml (0.067 mol) of thionyl chloride was added to the mixture, followed by stirring the resultant under heating at 60° C. for 2 hours. Then, inside the system was cooled down to around 40° C., and the toluene and the excess thionyl chloride were removed under the reduced pressure, to obtain Compound (B). Without refining compound (B) further, it was used in the next reaction immediately.

To a 500-ml three-neck flask, 10.0 g (0.062 mol) of aminophthalimide and 100 ml of N- methylpyrrolidone were added. While stirring the resultant under cooling by ice, 50 ml of the above compound (B) dissolved in acetonitrile was dropped down slowly through a dropping funnel. After stirring the resultant under cooling by ice for 30 minutes, it was further stirred at room temperature for 3 hours. Then, while stirring the resultant reaction mixture, water was added thereto. The thus-generated crude crystals were separated by filtration, and then washed by pouring water and acetonitrile. Afterwards, the crystals were separated by filtration, and dried, to obtain 14.4 g of Monomer (N). (Yield: 80%) The results of NMR measurement of Monomer (N) are shown below.

300 MHz in DMSO-d6

δ=5.43 (d, 1H, J=11.7 Hz), 6.03 (d, 1H, J=18.0 Hz), 6.85 (dd, 1H, J=11.7, 18.0 Hz), 7.67 (d, 2H, J=8.4 Hz), 7.83 (d, 1H, J=8.4 Hz), 7.99 (d, 2H, J=8.4 Hz), 8.15 (dd, 1H, J=1.8, 8.4 Hz), 8.34 (br.d, 1H, J=1.8 Hz), 10.77 (s, 1H), 11.27 (s, 1H).

(Synthesis of Polymer Compound)

Synthesis of Stylene/Methacrylic Acid Copolymer

To a 500-ml three-neck flask, 75 g of dimethylsulfoxide was added, and under a nitrogen gas flow, while heating the liquid at an inner temperature of 80° C., a mixed solution prepared by allowing 70 g (0.67 mol) of styrene, 30 g (0.35 mol) of methacrylic acid (MAA), 1.77 g (7.67 mmol) of V-601 (trade name, dimethyl 2,2'-azobis(2-methyl propionate)), and 150 g of dimethylsulfoxide was dropped thereto over 2 hours. After completion of the dropping, the resultant was stirred under heating at 80° C. for 2 hours as it was, and then, a solution of 0.88 g (3 8 mmol) of V-601 dissolved in 2 g of dimethylsulfoxide was further added, followed by stirring at 90° C. for 1 hour. 148 g of dimethylsulfoxide was added to the resultant mixture, and it was cooled to room temperature. 1 L of methanol and 1 L of water were placed in a 5-L stainless steel bucket, and while stirring the mixture at room temperature, the thus-obtained styrene/methacrylic acid copolymer mixture was added gradually thereto dropwise. The white powder obtained was collected by filtration, to give 67.5 g of a styrene/methacrylic acid copolymer (acid value: 178, mass-average molecular weight: 33,000).

Polymer Compound 1

To a 200-ml three-necked flask, 8.9 g (0.085 mol) of styrene, 5.0 g (0.014 mol) of monomer (C), 6.1 g (0.071 mol) of methacrylic acid, and 45.7 g of N-methylpyrrolidone were added. While heating the mixture at an internal temperature of 80° C. under nitrogen stream, a mixed solution of 0.39 g (1.7 mmol) of V-601 (dimethyl 2,2'-azobis(2-methyl propionate)) and 0.5 g of N-methylpyrrolidone was added thereto. The mixture was stirred as it was under heating at 80° C. A mixed solution of 0.39 g (1.7 mmol) of V-601 (dimethyl 2,2'-azobis(2-methyl propionate)) and 0.5 g of N-methylpyrrolidone was added thrice after every 2 hours, and the mixture was stirred at 80° C. additionally for 2 hours and cooled to room temperature. 600 ml of methanol and 600 ml of water were placed in a 3-L stainless steel bucket, and while stirring the mixture therein, the thus-obtained styrene/monomer (C)/methacrylic acid copolymer mixture was added dropwise thereto gradually. The powder obtained was collected by filtration, to give 10.5 g of Polymer compound 1 (acid value: 185, mass-average molecular weight: 20,000).

Polymer Compound 2

Styrene/monomer (D)/methacrylic acid copolymer (acid value: 182; mass-average molecular weight: 15,000) was obtained in the same manner as the synthesis of Polymer Compound 1 using styrene monomer, monomer (D), and methacrylic acid.

Polymer Compound 3

To a 200-ml three-necked flask, 8.9 g (0.085 mol) of tert-butylstyrene, 5.0 g (0.014 mol) of monomer (C), 6.1 g (0.071 mol) of methacrylic acid, and 45.7 g of N-methylpyrrolidone were added. While heating the mixture at an internal temperature of 80° C. under nitrogen stream, a mixed solution of 0.39 g (1.7 mmol) of V-601 (dimethyl 2,T-azobis(2-methyl propionate)) and 0.5 g of N-methylpyrrolidone was added thereto. The mixture was stirred as it was under heating at 80° C. A mixed solution of 0.39 g (1.7 mmol) of V-601 (dimethyl 2,2'-azobis(2-methyl propionate)) and 0.5 g of N-methylpyrrolidone was added thrice after every 2 hours, and the mixture was stirred at 80° C. additionally for 2 hours and cooled to room temperature. 600 ml of methanol and 600 ml of water were placed in a 3-L stainless steel bucket, and while stirring the mixture therein, the thus-obtained tert-butylstyrene/monomer (C)/methacrylic acid copolymer mixture was added dropwise thereto gradually. The powder obtained was collected by filtration, to give 11.0 g of Polymer compound 3 (acid value: 154, mass-average molecular weight: 34,000).

Polymer Compound 4

To a 200-ml three-necked flask, 9.86 g (0.095 mol) of styrene, 5.0 g (0.014 mol) of monomer (C), 5.14 g (0.071 mol) of acrylic acid, and 45.7 g of N-methylpyrrolidone were added. While heating the mixture at an internal temperature of 80° C. under nitrogen stream, a mixed solution of 0.415 g (1.8 mmol) of V-601 (dimethyl 2,2'-azobis(2-methyl propionate)) and 0.5 g of N-methylpyrrolidone was added thereto. The mixture was stirred as it was under heating at 80° C. A mixed solution of 0.415 g (1.8 mmol) of V-601 (dimethyl 2,2'-azobis(2-methyl propionate)) and 0.5 g of N-methylpyrrolidone was added thrice after every 2 hours, and the mixture was stirred at 80° C. additionally for 2 hours and cooled to room temperature. 400 ml of methanol and 800 ml of water were placed in a 3-L stainless steel bucket, and while stirring the mixture therein, the thus-obtained styrene/monomer (C)/acrylic acid copolymer mixture was added dropwise thereto gradually. The powder obtained was collected by filtration, to give 10.9 g of Polymer compound 4 (acid value: 152, mass-average molecular weight: 30,000).

Polymer Compound 5

To a 200-ml three-necked flask, 0.3 g (2.9 mmol) of styrene, 5.0 g (0.014 mol) of monomer (C), 14.7 g (about 0.071 mol) of 4-vinylbenzenesulfonic acid sodium salt hydrate, and 79.0 g of dimethyl sulfoxide were added. While heating the mixture at an internal temperature of 80° C. under nitrogen stream, a mixed solution of 0.203 g (0.881 mmol) of V-601 (dimethyl 2,2'-azobis(2-methyl propionate)) and 0.5 g of N-methylpyrrolidone was added thereto. The mixture was stirred as it was under heating at 80° C. A mixed solution of 0.203 g (0.881 mmol) of V-601 (dimethyl 2,2'-azobis(2-methyl propionate)) and 0.5 g of dimethyl sulfoxide was added thrice after every 2 hours, and the mixture was stirred at 80° C. additionally for 2 hours and cooled to room temperature. 1,500 ml of acetone was placed in a 3-L stainless steel bucket, and while stirring the liquid therein, the thus-obtained styrene/monomer (C)/sodium 4-vinylbenzoate copolymer mixture was added dropwise thereto gradually. The powder obtained was collected by filtration, to give 19.2 g of Polymer compound 5.

Polymer Compound 6

To a 200-ml three-necked flask, 8.9 g (0.085 mol) of tert-butylstyrene, 5.0 g (0.017 mol) of monomer (F), 6.1 g (0.071 mol) of methacrylic acid, and 45.7 g of N-methylpyrrolidone were added. While heating the mixture at an internal temperature of 80° C. under nitrogen stream, a mixed solution of 0.39 g (1.7 mmol) of V-601 (dimethyl 2,2'-azobis(2-methyl propionate)) and 0.5 g of N-methylpyrrolidone was added thereto. The mixture was stirred as it was under heating at 80° C. A mixed solution of 0.39 g (1 7 mmol) of V-601 (dimethyl 2,2'-azobis(2-methyl propionate)) and 0.5 g of N-methylpyrrolidone was added thrice after every 2 hours, and the mixture was stirred at 80° C. additionally for 2 hours and cooled to room temperature. 600 ml of methanol and 600 ml of water were placed in a 3-L stainless steel bucket, and while stirring the mixture therein, the thus-obtained tert-butylstyrene/monomer (F)/methacrylic acid copolymer mixture was added dropwise thereto gradually. The powder obtained was collected by filtration, to give 12.5 g of Polymer compound 6 (acid value: 159, mass-average molecular weight: 31,000).

Polymer Compound 7

To a 200-ml three-necked flask, 8.9 g (0.085 mol) of tert-butylstyrene, 5.0 g (0.013 mol) of monomer (H), 6.1 g (0.071 mol) of methacrylic acid, and 45.7 g of N-methylpyrrolidone were added. While heating the mixture at an internal temperature of 80° C. under nitrogen stream, a mixed solution of 0.39 g (1.7 mmol) of V-601 (dimethyl 2,2'-azobis(2-methyl propionate)) and 0.5 g of N-methylpyrrolidone was added thereto. The mixture was stirred as it was under heating at 80° C. A mixed solution of 0.39 g (1.7 mmol) of V-601 (dimethyl 2,2'-azobis(2-methyl propionate)) and 0.5 g of N-methylpyrrolidone was added thrice after every 2 hours, and the mixture was stirred at 80° C. additionally for 2 hours and cooled to room temperature. 600 ml of methanol and 600 ml of water were placed in a 3-L stainless steel bucket, and while stirring the mixture therein, the thus-obtained tert-butylstyrene/monomer (H)/methacrylic acid copolymer mixture was added dropwise thereto gradually. The powder obtained was collected by filtration, to give 13.2 g of Polymer compound 7 (acid value: 163, mass-average molecular weight: 39,000).

Polymer Compound 8

To a 200-ml three-necked flask, 8.9 g (0.085 mol) of tert-butylstyrene, 5.0 g (0.015 mol) of monomer (M), 6.1 g (0.071 mol) of methacrylic acid, and 45.7 g of N-methylpyrrolidone were added. While heating the mixture at an internal temperature of 80° C. under nitrogen stream, a mixed solution of 0.39 g (1.7 mmol) of V-601 (dimethyl 2,T-azobis(2-methyl propionate)) and 0.5 g of N-methylpyrrolidone was added thereto. The mixture was stirred as it was under heating at 80° C. A mixed solution of 0.39 g (1.7 mmol) of V-601 (dimethyl 2,2'-azobis(2-methyl propionate)) and 0.5 g of N-methylpyrrolidone was added thrice after every 2 hours, and the mixture was stirred at 80° C. additionally for 2 hours and cooled to room temperature. 600 ml of methanol and 600 ml of water were placed in a 3-L stainless steel bucket, and while stirring the mixture therein, the thus-obtained tert-butylstyrene/monomer (M)/methacrylic acid copolymer mixture was added dropwise thereto gradually. The powder obtained was collected by filtration, to give 14.1 g of Polymer compound 8 (acid value: 155, mass-average molecular weight: 29,000).

Polymer Compound 9

To a 200-ml three-necked flask, 8.9 g (0.085 mol) of tert-butylstyrene, 5.0 g (0.017 mol) of monomer (N), 6.1 g (0.071 mol) of methacrylic acid, and 45.7 g of N-methylpyrrolidone were added. While heating the mixture at an internal temperature of 80° C. under nitrogen stream, a mixed solution of 0.39 g (1 7 mmol) of V-601 (dimethyl 2,2'-azobis(2-methyl propionate)) and 0.5 g of N-methylpyrrolidone was added thereto. The mixture was stirred as it was under heating at 80° C. A mixed solution of 0.39 g (1.7 mmol) of V-601 (dimethyl 2,T-azobis(2-methyl propionate)) and 0.5 g of N-methylpyrrolidone was added thrice after every 2 hours, and the mixture was stirred at 80° C. additionally for 2 hours and cooled to room temperature. 600 ml of methanol and 600 ml of water were placed in a 3-L stainless steel bucket, and while stirring the mixture therein, the thus-obtained tert-butylstyrene/monomer (N)/methacrylic acid copolymer mixture was added dropwise thereto gradually. The powder obtained was collected by filtration, to give 10.3 g of Polymer compound 9 (acid value: 161, mass-average molecular weight: 27,000).

Example 1

6.6 g of C.I. Pigment Red 122 (hereinafter, referred to as PR122), 83.2 g of dimethylsulfoxide and 16.8 g of tetramethylammonium hydroxide (hereinafter referred to as $Me_4NOH$, 25% methanol solution) as alkali were added with 3.3 g of Polymer compound 1, and the mixture was stirred under heating at 40° C., to give a completely dissolved dark blue purple pigment solution.

1200 g of ion-exchange water was placed in a 5-L beaker. While stirring the water on ice bath, the above pigment solution sucked up with a Terumo syringe (trade name: SS-50ESZ) and a Terumo needle (trade name: NN-1838R, diameter: 1.20 mm×length 38 mm) both manufactured by Terumo Corporation was discharged rapidly thereto, to give a pigment dispersion. The pigment dispersion was stirred, as cooled by ice, for 30 minutes, and transferred into a 2-L three-necked flask. The dispersion was heated at an external temperature set to 50° C. for 3 hours. The pigment dispersion was then cooled to room temperature, adjusted to a pH of 7.0 by adding dilute hydrochloric acid dropwise, allowing aggregation of the pigment particles in the pigment dispersion, to give agglomerates. The agglomerates obtained were filtered under reduced pressure through a membrane filter with an average pore size of 0.2 μm and washed twice with ion-exchange water, to give a agglomerate pigment powder a. Then, 200 ml of acetone was added to the collected pigment powder a, and the mixture was stirred at room temperature for 1 hour and filtered again through a membrane filter with an average pore-size of 0.2 μm under reduced pressure, to give a dispersion powder b of pigment particles that were demineralized and solvent-removed.

Ion-exchange water and 4.72 g of aqueous 15% sodium hydroxide solution were then added to the powder, until the pigment content became 10%, and the mixture was ultrasonicated in an ultrasonic homogenizer US-150T (trade name) manufactured by Nippon Seiki Co., Ltd. for 9 hours, to give a high-concentration pigment dispersion A. The average particle diameter (Mv) of the pigment dispersion liquid A, as determined by dynamic light scattering method, was 32 nm (TEM average particle diameter: 25 nm), and the viscosity thereof was 4.58 mPa·s.

Examples 2 to 9, Comparative Examples 1 and 2

Pigment dispersions were prepared in the same manner as Example 1, except that the polymer compound 1 was replaced with polymer compounds 2 to 9 (dispersions B to I of Examples 2 to 9), the styrene/methacrylic acid copolymer (St/MAA) (dispersion J of Comparative Example 1) or a polymer compound D-1 containing M-4 as its component (dispersion K of Comparative Example 2), respectively.

The measurement results of the particle diameters of the pigment dispersions obtained in Comparative Examples 1 and 2 and Examples 1 to 9 are summarized in the Table 1.

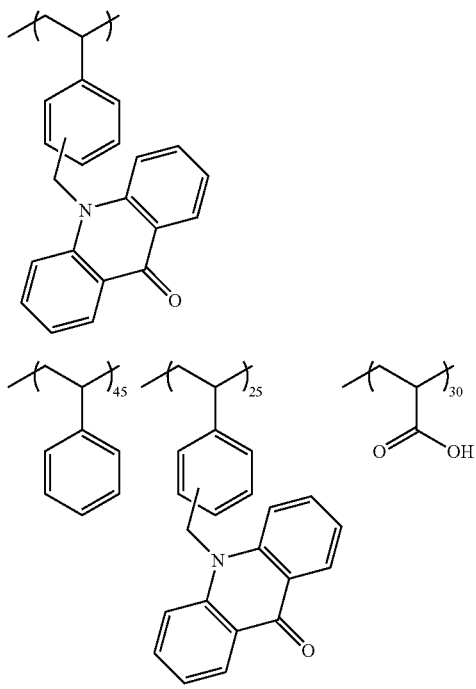

three-necked flask. Separately, a dispersant solution was prepared by dissolving 3.3 g of the polymer compound 3 previously prepared in 3.5 g of 25% tetramethylammonium hydroxide and 30 g of a solution of dimethylsulfoxide and water (ratio 1:2). The dispersant solution was added to the pigment dispersion; and the mixture was heated at an external temperature set to 50° C. for 3 hours. The pigment dispersion was then cooled to room temperature, adjusted to a pH of 7.0 by adding dilute hydrochloric acid dropwise, allowing aggregation of the pigment particles in the pigment dispersion, to give agglomerates. The agglomerates obtained were filtered under reduced pressure through a membrane filter with an average pore size of 0.2 μm and washed twice with ion-exchange water, to give a agglomerate pigment powder. Then, 200 ml of acetone was added to the collected pigment powder, and the mixture was stirred at room temperature for 1 hour and filtered again through a membrane filter with an average pore-size of 0.2 μm under reduced pressure, to give a dispersion powder of pigment particles that were demineralized and solvent-removed.

Ion-exchange water and 4.72 g of aqueous 15% sodium hydroxide solution were then added to the powder, until the pigment content became 10%, and the mixture was ultrasonicated in an ultrasonic homogenizer US-150T manufactured by Nippon Seiki Co., Ltd. for 9 hours, to give a high-concentration pigment dispersion L. The average particle diameter (Mv) of the pigment dispersion L, as determined by dynamic light scattering method, was 38 nm (TEM average particle diameter: 28 nm), and the viscosity thereof was 5.12 mPa·s.

TABLE 1

|  | Pigment | Dispersant | Particle diameter (Mv) | TEM average particle diameter |
|---|---|---|---|---|
| Comparative example 1 | PR122 | St/MAA | 28 nm | 24 nm |
| Comparative example 2 | PR122 | D-1 | 37 nm | 25 nm |
| Example 1 | PR122 | Polymer compound 1 | 32 nm | 25 nm |
| Example 2 | PR122 | Polymer compound 2 | 36 nm | 29 nm |
| Example 3 | PR122 | Polymer compound 3 | 33 nm | 27 nm |
| Example 4 | PR122 | Polymer compound 4 | 32 nm | 25 nm |
| Example 5 | PR122 | Polymer compound 5 | 35 nm | 28 nm |
| Example 6 | PR122 | Polymer compound 6 | 29 nm | 25 nm |
| Example 7 | PR122 | Polymer compound 7 | 32 nm | 25 nm |
| Example 8 | PR122 | Polymer compound 8 | 22 nm | 19 nm |
| Example 9 | PR122 | Polymer compound 9 | 37 nm | 29 nm |

The dispersions containing the particular polymer compounds according to the present invention had sufficiently small particle diameters and narrow particle diameter distributions, and were in the monodispersion state.

Example 10

6.6 g of C.I. Pigment Red 122 (hereinafter, referred to as PR122), 83.2 g of dimethylsulfoxide and 16.8 g of tetramethylammonium hydroxide (hereinafter referred to as Me$_4$NOH, 25% methanol solution) as alkali were stirred under heating at 40° C., to give a completely dissolved dark blue purple pigment solution.

166 g of ion-exchange water was placed in a 5-L beaker. While stirring the water on ice bath, the above pigment solution sucked up with a Terumo syringe (trade name: SS-50ESZ) and a Terumo needle (trade name: NN-1838R, diameter: 1.20 mm×length 38 mm) both manufactured by Terumo Corporation was discharged rapidly thereto, to give a pigment dispersion. The pigment dispersion was stirred, as cooled by ice, for 30 minutes, and transferred into a 2-L (Residual Rate of Dispersant)

Subsequently, each of the agglomerate powders prepared in Comparative examples 1 and 2, Examples 1 to 3, and Examples 6 to 10 was washed with an organic solvent (triethylene glycol monobutylether), separated by filtration, and dissolved in N-methylpyrrolidone. The purity of the pigment therein was calculated from the UV absorption spectrum, and the residual rate of the dispersant remaining in the pigment particle was determined from the difference.

TABLE 2

|  | Dispersant | Ratio of Dispersant/ Pigment (added) | Ratio of Dispersant/ Pigment (after washing) | Residual dispersant rate (%) |
|---|---|---|---|---|
| Comparative example 1 | St/MAA | 0.5 | 0.01 | 2 |
| Comparative example 2 | D-1 | 0.5 | 0.06 | 12 |

TABLE 2-continued

|  | Dispersant | Ratio of Dispersant/ Pigment (added) | Ratio of Dispersant/ Pigment (after washing) | Residual dispersant rate (%) |
|---|---|---|---|---|
| Example 1 | Polymer compound 1 | 0.5 | 0.18 | 36 |
| Example 2 | Polymer compound 2 | 0.5 | 0.12 | 24 |
| Example 3 | Polymer compound 3 | 0.5 | 0.19 | 38 |
| Example 6 | Polymer compound 6 | 0.5 | 0.16 | 32 |
| Example 7 | Polymer compound 7 | 0.5 | 0.15 | 30 |
| Example 8 | Polymer compound 8 | 0.5 | 0.32 | 64 |
| Example 9 | Polymer compound 9 | 0.5 | 0.12 | 24 |
| Example 10 | Polymer compound 3 | 0.5 | 0.17 | 34 |

Note:
"Ratio of Dispersant/Pigment" (D/P ratio) is in terms of mass ratio, and "Residual dispersant rate" is in terms of mass percentage.

As obvious from the results in Table 2, the conventional styrene/methacrylic acid copolymer had a smaller residual rate after the washing with organic solvent and thus would be readily released and eluted into ink, while the dispersions prepared by using the particular polymer compounds according to the present invention had higher residual rates of the polymer compounds and thus these were improved in solvent resistance.

Examples 11 to 14

Pigment dispersions were prepared in the same manner as Example 1, except that PR122 was replaced to C. I. Pigment Yellow 74 (abbreviated as PY74 hereinafter, Example 11, Dispersion M), C. I. Pigment Yellow 128 (abbreviated as PY128 hereinafter, Example 12, Dispersion N), C. I. Pigment Red 254 (abbreviated as PR254 hereinafter, Example 13, Dispersion O), and C. I. Pigment Violet 19 (abbreviated as PV19 hereinafter, Example 14, Dispersion P).

TABLE 3

|  | Pigment | Dispersant | Particle diameter (Mv) | TEM average particle diameter |
|---|---|---|---|---|
| Example 11 | PY74 | Polymer compound 1 | 43 nm | 39 nm |
| Example 12 | PY128 | Polymer compound 1 | 37 nm | 30 nm |
| Example 13 | PR254 | Polymer compound 1 | 39 nm | 32 nm |
| Example 14 | PV19 | Polymer compound 1 | 32 nm | 25 nm |

According to the present invention, it was possible to obtain pigment dispersions containing particles having a sufficiently small particle diameter and a narrow particle diameter distribution (monodispersion), similarly to the PR122 as described above, even if the pigment type was altered.

(Preparation of Ink Composition)

Example 15

50 parts by mass of the pigment dispersion A (Example 1) was mixed with 17.5 parts by mass of glycerol (SP value: 33.5; CLogP: -1.538), 0.2 part by mass of Acetylenol EH (trade name, manufactured by Kawaken Fine Chemicals Co., Ltd.), and 32.3 parts by mass of ion-exchange water, and then the mixture was ultrasonicated, to give Ink composition 1-1.

Comparative Examples 3 and 4

50 parts by mass of the pigment dispersion J (Comparative example 1) or the dispersion K (Comparative example 2) was mixed with 17.5 parts by mass of glycerol, 0.2 part by mass of Acetylenol EH (trade name, manufactured by Kawaken Fine Chemicals Co., Ltd.), and 32.3 parts by mass of ion-exchange water, and then the mixture was ultrasonicated, to give Ink composition 1-2 or 1-3, respectively.

[Evaluation of Storage Stability]

First, the dynamic light-scattering average particle diameter of each of the obtained ink compositions 1-1 to 1-3 was determined on the day of its preparation. Then, the average particle diameter of each of these ink compositions was determined again by dynamic light scattering, after they were stored under the heating condition of an external temperature adjusted to 60° C. for 1 week. The changes in particle diameter after lapse of time are shown in Table 4.

TABLE 4

|  | Pigment | Dispersant | Initial particle diameter | Particle diameter after lapse of time |
|---|---|---|---|---|
| Example 15 | PR122 | Polymer compound 1 | 29 nm | 33 nm |
| Comparative example 3 | PR122 | St/MAA | 28 nm | 64 nm |
| Comparative example 4 | PR122 | D-1 | 37 nm | 44 nm |

Note:
"Particle diameter" is in terms of volume average diameter [Mv].

As obvious from the results in Table 4, the ink composition prepared by using the dispersion containing the particular polymer compound according to the present invention was drastically improved in storage stability, compared to those of conventional inks (Comparative examples).

Examples 16 and 17

50 parts by mass of the pigment dispersion C (Example 3) or the dispersion H (Example 8) was mixed with 17.5 parts by mass of triethylene glycol monobutylether (Wako Pure Chemical Industries), 0.2 part by mass of Acetylenol EH (trade name, manufactured by Kawaken Fine Chemicals Co., Ltd.), and 32.3 parts by mass of ion-exchange water, and then the mixture was ultrasonicated, to give Ink composition 1-4 or 1-5, respectively.

Comparative Examples 5 and 6

50 parts by mass of the pigment dispersion J (obtained in Comparative example 1) or the dispersion K (obtained in Comparative example 2) was mixed with 17.5 parts by mass of triethylene glycol monobutylether (Wako Pure Chemical Industries; SP value: 21; CLogP: 0.569), 0.2 part by mass of Acetylenol EH (trade name, manufactured by Kawaken Fine Chemicals Co., Ltd.), and 32.3 parts by mass of ion-exchange water, and then the mixture was ultrasonicated, to give Ink composition 1-6 or 1-7, respectively.

[Evaluation of Storage Stability]

First, the dynamic light-scattering average particle diameter of each of the obtained ink compositions 1-4 to 1-7 was determined on the day of its preparation. Then, the average particle diameter of each of these ink compositions was determined again by dynamic light scattering, after they were stored under the heating condition of an external temperature adjusted to 60° C. for 1 week. The changes in particle diameter after lapse of time are shown in Table 5. Further, the viscosities of these inks before and after the heating were measured in the same manner as the above.

[Measuring Method of Viscosity]

The viscosity was determined by using a type-E rotational viscometer (RE-80L (trade name)) manufactured by Toki Sangyo Co., Ltd. at a constant temperature of 25° C.

TABLE 5

|  | Pigment | Dispersant | Initial particle diameter | Initial viscosity | Particle diameter after lapse of time | Viscosity after lapse of time |
|---|---|---|---|---|---|---|
| Comparative example 5 | PR122 | St/MAA | 130 | not measurable | not measurable | not measurable |
| Comparative example 6 | PR122 | D-1 | 70 | not measurable | not measurable | not measurable |
| Example 16 | PR122 | Polymer compound 3 | 37 | 8.6 | 49 | 9.3 |
| Example 17 | PR122 | Polymer compound 8 | 22 | 7.9 | 51 | 9.1 |

(Particle diameter: volume average diameter [unit: nm], Viscosity: [Unit: mPa · sec.])

As obvious from Table 5, when hydrophobic inks were prepared with using traditional St/MAA or D-1, the inks were aggregated rapidly, and the particle diameter and the viscosity increased significantly to a degree prohibiting measurement. The inks prepared by using the dispersion containing the particular polymer compound according to the present invention were improved significantly in stability.

Example 18

(Production of Magenta Dispersing Liquid Q)

100 parts of methylethylketone and 3.0 parts of 30% aqueous sodium hydroxide solution were added to 20 parts of the polymer compound 1; the mixture was stirred with a high-speed disper for 5 minutes. 480.0 parts of Magenta pigment C.I. PR122 was added thereto, and the mixture was stirred with the high-speed disper for 1 hour, to give a pigment dispersion slurry. The pigment dispersion slurry was dispersed ten times, continuously, in an ultrahigh-pressure homogenizer (trade name: Microfluidizer, manufactured by Mizuho Industrial Co., Ltd.) under a pressure of 200 MPa, to give a pigment dispersion liquid.

Subsequently, a part of methyl ethyl ketone and water was removed from the thus-obtained pigment dispersion liquid, by distillation under reduced pressure, by using an evaporator, and the residue was centrifuged in a centrifugal separator (05P-21, trade name, manufactured by Hitachi Ltd.) for 30 minutes at 5,000 rpm and diluted with ion-exchange water to a pigment concentration of 15% by mass, to prepare a pigment dispersion liquid Q.

The dispersion liquid was then filtered through a 2.5-μm membrane filter (manufactured by Advantech) under pressure. The pigment dispersion liquid Q was diluted with ultrapure water to 1,000 times; the volume average diameter (dispersion average diameter), as determined by dynamic light scattering method, was 79.2 nm (TEM average particle diameter: 53.5 nm), and the ratio of volume average particle diameter My/number-average particle diameter Mn, which is an indicator of monodispersity, was 1.62. Then, an ink composition 1-8 was prepared in the same manner as Example 16, except that the pigment dispersion C was replaced with the dispersion liquid Q.

Example 19

Production of Magenta Dispersion Liquid R

A pigment dispersion liquid R was prepared in the same manner as the magenta ink Q, except that the stirring by using a high-speed disper was changed to stirring by using Picomill (trade name, manufactured by Asada Iron Works Co., Ltd.) (dispersion medium: zirconia, temperature: 20° C., mass ratio of dispersion medium/dispersion: 8/2) at a peripheral speed of 8 m/s for 12.5 hours. Then, an ink composition 1-9 was prepared in the same manner as Example 16, except that the pigment dispersion C was replaced with the dispersion liquid R.

Comparative Examples 7 and 8

A pigment dispersion liquid S or T was prepared in the same manner as the magenta dispersion liquid Q, except that the polymer compound 1 was replaced with the styrene/methacrylic acid copolymer or Polymer compound D-1, respectively. An ink composition 1-10 or 1-11 was then obtained in the same manner as in Example 16, except that the pigment dispersion C was replaced with the dispersion liquid S or T, respectively.

[Evaluation of Storage Stability]

First, the dynamic light-scattering average particle diameter of each of the obtained ink compositions 1-8 to 1-11 was determined on the day of its preparation. Then, the average particle diameter of each of these ink compositions was determined again by dynamic light scattering, after they were stored under the heating condition of an external temperature adjusted to 60° C. for 1 week. The changes in particle diameter after lapse of time are shown in Table 6.

TABLE 6

| | Pigment | Dispersant | Initial particle diameter | Initial viscosity | Particle diameter after lapse of time | Viscosity after lapse of time |
|---|---|---|---|---|---|---|
| Comparative example 7 | PR122 | St/MAA | 91 | 10.9 | 150 | 31.3 |
| Comparative example 8 | PR122 | D-1 | 78 | 7.3 | 120 | 12.4 |
| Example 18 | PR122 | Polymer compound 1 | 79 | 7.5 | 89 | 8.3 |
| Example 19 | PR122 | Polymer compound 1 | 84 | 7.4 | 91 | 8.3 |

The dispersion liquids and the inks prepared by using the dispersant according to the present invention were superior in stability, even if the breakdown method was employed.

Comparative Examples 9 to 11

20 g of C.I. Pigment Red 122, 1.3 g of sodium oleate, and 78.7 g of ion-exchange water were mixed and dispersed by using a bead mill for 4 hours, to give a pigment dispersion U. The average particle diameter of the pigment dispersion liquid U, as determined by dynamic light scattering method, was 80.1 nm (TEM average particle diameter: 79.2 nm). Although particles of nanometer sizes were obtained, longer period was needed to make particles fine, and larger energy was also needed for pulverization. In addition, the pigment fine particles thus obtained were larger in particle diameter, compared to those prepared by the build-up method.

Pigment dispersions V and W were prepared by performing dispersion for 4 hours in a bead mill in the same manner as the pigment dispersion U, except that C.I. Pigment Red 122 was replaced respectively with C.I. Pigment Red 254 and C.I. Pigment Violet 19. The average particle diameter of the pigment dispersion liquid M, as determined by dynamic light scattering method, was 87.5 nm (TEM average particle diameter: 84.9 nm), and the average diameter of the pigment dispersion liquid N, as determined by dynamic light scattering method, was 85.0 nm (TEM average particle diameter: 93.4 nm). Similarly to the above, long period and large energy were needed to obtain fine particles, and the resulted particles had a larger particle diameter than the particles prepared by the build-up method.

50 mass parts of each of the pigment dispersions U to W was mixed with 17.5 mass parts of glycerol, 0.2 mass part of Acetyrenol EH, and 32.3 mass parts of ion-exchanged water. Thereafter, the resultant mixture was subjected to an ultrasonic treatment to each obtain ink compositions 1-12 to 1-14, respectively.

[Evaluation of Light Fastness]

A light fastness test was performed in such a manner and conditions that the ink composition 1-1 was spin coated on a glass substrate, and the resultant coating was set in a fade meter and irradiated by a xenon lamp with illuminance of 170,000 lux for 4 days. As a UV filter, there was disposed a TEMPAX filter (trade name, manufactured by Eagle Engineering; quality of material: TEMPAX glass (trade name, manufactured by SCHOTT)) between the light source and the sample. The absorbance before irradiation and the absorbance after irradiation of the ink composition 1-1 were measured. The residual rate of absorbance of the ink composition 1-1 was as follows:

Residual rate of absorbance {(Absorbance after irradiation)/(Absorbance before irradiation)×100}: 80.3%

A fade test was performed in the same manner as the above, except that the ink composition 1-2 was spin coated on a glass substrate. The residual rate of absorbance of the ink composition 1-2 was 69.8%. From these results, it is understood that light fastness of the ink can be remarkably improved by the present invention.

[Evaluation of Transparency]

Evaluation of transparency was performed by visual observation according to the criterion described below with respect to the ink compositions.

Further, each of the above-described ink compositions was coated with a bar coater on a 60-μm thick polyethylene terephthalate (PET) sheet (trade name: PPL/for laser printer (Xerox film OHP FILM), manufactured by Xerox Corporation), and was followed by drying to produce a printed article. Thereafter, the transparency of the printed area was evaluated visibly according to the criterion described below.

3: Extremely excellent
2: Excellent
1: Poor

[Evaluation of Discharging Property]

Each of the ink compositions was charged into a cartridge of an inkjet printer PX-G930 (trade name, manufactured by Seiko-Epson). Using the inkjet printer, a solid image (reflection density: 1.0) was printed at the whole surface of an inkjet paper (a photographic base paper "KOTAKU (Gloss)" trade name, manufactured by Seiko-Epson) to count numbers of "white streaks" generated during print. Evaluation of discharging property was performed according to the criterion as set below:

3: There is no generation of white streaks (non-printed area) all over the printing surface.

2: Generation of white streaks is slightly observed, which is no problem in practical use.

1: Generation of white streaks is frequently observed all over the printing surface, which is not an allowable quality in practical use.

The results of evaluation are shown in Table 7.

TABLE 7

| Ink Composition | Transparency of Ink composition | Transparency of printed portion | Discharging property of ink |
|---|---|---|---|
| Example 15 | 3 | 2 | 3 |
| Comparative example 9 | 1 | 1 | 1 |
| Comparative example 10 | 1 | 2 | 1 |
| Comparative example 11 | 1 | 1 | 1 |

As shown in Table 7, the ink composition (recording liquid) according to the present invention and the printed article prepared with using the ink composition had extremely high transparency and were superior in discharging property and color fastness to light.

Example 20, Comparative Examples 12 to 14

[Preparation of Pigment Paste]

To the pigment powder b prepared to obtain Pigment dispersion A in Example 1, tetramethylammonium hydroxide was added in a small amount necessary for neutralization, and was followed by addition of a small amount of No. 5 solvent (hereinafter referred to as solvent) and kneading with a super mixer ARE-250 (trade name, manufactured by Thinky corporation), thereby to obtain a pigment paste a.

Subsequently, hydrochloric acid was added drop-wise to the dispersions U to W to adjust pH to 3.5. Thereby pigment particles were aggregated from the medium. Thereafter, the thus-obtained aggregates were filtrated under reduced pressure by using a membrane filter (average pore size 0.2 μm), and then washed twice with ion-exchanged water. Thereby dispersions containing desalted and solvent-removed pigment particles were obtained. To the pigment powders, tetramethylammonium hydroxide was added in a small amount necessary for neutralization, followed by addition of a small amount of the No. 5 solvent and kneading with the super mixer ARE-250 (manufactured by Thinky corporation), thereby to obtain pigment pastes b to d.

(Preparation of Resin Varnish)

Rosin-modified phenol resin (TESPOL 1355 (trade name) manufactured by Hitachi Kasei Polymer Co., Ltd.) was dissolved by heating in a mixed solvent of linseed oil and the No. 5 solvent, to obtain resin varnish A (resin concentration: 55% by mass). Further, rosin-modified phenol resin (TESPOL 1304 (trade name) manufactured by Hitachi Kasei Polymer Co., Ltd.) was dissolved by heating in a mixed solvent of linseed oil and the No. 5 solvent, to obtain resin varnish B (resin concentration: 55% by mass).

(Preparation of Resin for Dispersing Pigments)

A mixture of 100 parts of 12-hydroxystearic acid, 10 parts of xylene, and 0.1 parts of tetra-n-butyl titanate was placed in a separable flask equipped with a condenser, a water separator, a thermometer, and a nitrogen-introducing tube, and heated with stirring at a temperature of 180° C. to 200° C. for 6 hours. At this time, mixing was performed under nitrogen gas stream while separating the produced water to the water separator. Subsequently, xylene was removed by distillation under reduced pressure, to obtain a polyester resin having a carboxyl group (hereinafter, described as a resin for dispersing pigments). The resin was a pale brown polymer having a weight average molecular weight of 4,000 and an acid value of 30.

(Ink Composition)

Ink bases 1 to 4 were prepared according to the formulations set forth below. It should be noted that at the beginning of the preparation, the solvent was added to each of pigment pastes a to d and subjected to a thorough ultrasonic treatment, and thereafter other components were added thereto and stirred, and then kneaded by a three-roll mill.

TABLE 8

(Formulation of Ink Base)

| Ingredient | Base 1 | Base 2 | Base 3 | Base 4 |
|---|---|---|---|---|
| | | | | unit (mass part) |
| Pigment paste a | 40 | | | |
| Pigment paste b | | 40 | | |
| Pigment paste c | | | 40 | |
| Pigment paste d | | | | 40 |
| Resin for dispersing pigments | 8 | 8 | 8 | 8 |
| Resin varnish A | 42 | 42 | 42 | 42 |
| Solvent | 10 | 10 | 10 | 10 |

Ink compositions 2-1 to 2-4 were prepared using the above ink bases in accordance with the formulation set forth below. It should be noted that the ink base 1 corresponds to the ink composition 2-1, and likewise the ink bases 2 to 4 correspond to the ink compositions 2-2 to 2-4, respectively.

(Formulation of Ink)

| Ingredient | Mass Part |
|---|---|
| Ink Base | 40 |
| Resin varnish B | 50 |
| Wax | 5 |
| Solvent | 5 |

In the above formulation, as the wax, there was used a polyethylene wax compound manufactured by Shamrock Co. The resin varnish B used was a solution obtained by mixing a rosin-modified phenol resin (Tespol 1304 (trade name), manufactured by Hitachi Kasei Polymer Co., Ltd.,), a linseed oil and the solvent and dissolving them under heating (resin concentration: 55 mass %).

In the preparation of the ink compositions, the solvent was added to the ink base and subjected to a thorough ultrasonic treatment, and thereafter other components were added thereto with stirring, and then the solvent was further added thereto so that the pigment content was ultimately 15%.

[Evaluation of Transparency]

Each of ink compositions 2-1 to 2-4 was coated with a bar coater on a 60-μm-thick polyethylene terephthalate (PET) sheet, followed by drying, to produce a printed article. Thereafter, the transparency of the printed area was evaluated visibly according to the criterion described below.

2: Excellent

1: Poor

[Evaluation of Light Fastness]

Each of the ink compositions 2-1 to 2-4 was coated on a Premium Glossy Photo Paper (trade name, manufactured by Seiko-Epson Co.) using a bar coater and dried. Thereafter, an initial reflection density ($I_0$) of each of the resultant coatings was measured, and then each of the coatings was irradiated by a xenon lamp with illuminance of 170,000 lux for 4 days to measure a reflection density ($I_1$). A ratio of $I_1/I_0 \times 100$ (%) was calculated and evaluation was performed according to the criterion as set forth below.

3: 95% to 100%

2: 90% or more and less than 95%

1: less than 90%

Each evaluation results are shown in Table 9.

TABLE 9

|  | Transparency | Light resistance |
|---|---|---|
| Ink Composition 2-1 (Example 20) | 2 | 3 |
| Ink Composition 2-2 (Comparative example 12) | 1 | 2 |
| Ink Composition 2-3 (Comparative example 13) | 1 | 2 |
| Ink Composition 2-4 (Comparative example 14) | 1 | 1 |

As seen from Table 9, printed articles formed by using the ink composition (recording liquid) according to the present invention was excellent in both transparency and light fastness, even though the ink composition was of high concentration.

From the above results, it is concluded that the particles of the water-insoluble colorant in the dispersion of the present invention are made small to fine down to nanometer sizes, and the aggregation is suppressed and maintains favorable dispersibility. Further, the producing method according to the present invention enables to produce dispersion having the above mentioned superior performance efficiently and with an excellent purity. Furthermore, because the recording liquid and the printed article using the recording liquid have high transparency and the recording liquid is superior in discharging property due to the small particle sizes, they can be suitably used as the ink in the case where the color shade of the printed article is adjusted by the ejecting amount of the ink such as in the ink-jet recording system. The ink composition made from the dispersion of the present invention is superior in transparency and in fastness to light, and accordingly, can provide a recording liquid, an image forming method, and an image forming apparatus, giving an image having high accuracy and high quality.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-018657 filed in Japan on Jan. 29, 2009 and Patent Application No. 2009-129697 filed in Japan on May 28, 2009, each of which is entirely herein incorporated by reference.

What we claim is:

1. A dispersion of a water-insoluble colorant, comprising: fine particles of at least one kind of water-insoluble colorant dispersed in a water-containing medium; and a polymer compound having a structural unit represented by formula (I):

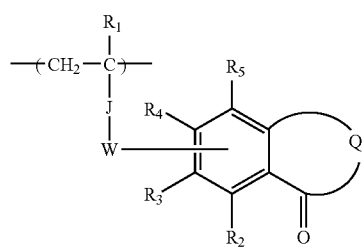

Formula (I)

wherein $R_1$ represents a hydrogen atom or a substituent; one of $R_2$ to $R_5$ represents a single bond which bonds to W, and the others each independently represent a hydrogen atom or a substituent;

Q represents a group of atoms necessary for forming, with the carbon atoms, a ring; J represents —CO—, —COO—, —CONR$_6$—, —OCO—, a methylene group, a phenylene group, or —C$_6$H$_4$CO—; R$_6$ represents a hydrogen atom, an alkyl group, an aryl group or an aralkyl group; W represents a single bond or a divalent linking group; and wherein the polymer compound is embedded into the water-insoluble colorant particle by a process comprising the steps of:
dissolving the water-insoluble colorant, the polymer compound, and a base, into an aprotic water-soluble organic solvent;
bringing the resultant solution into contact with an aqueous medium; and
forming the fine particles of the water-insoluble colorant dispersed in the water-containing medium.

2. The dispersion of a water-insoluble colorant according to claim 1, wherein the polymer compound or surfactant additionally has a structural unit having at least one kind of acid group as hydrophilic unit.

3. The dispersion of a water-insoluble colorant according to claim 2, wherein the acid group is selected from the group consisting of a carboxylic acid group, a sulfonic acid group, and a phosphoric acid group.

4. The dispersion of a water-insoluble colorant according to claim 1, wherein the unit represented by formula (I) is a unit represented by formula (II):

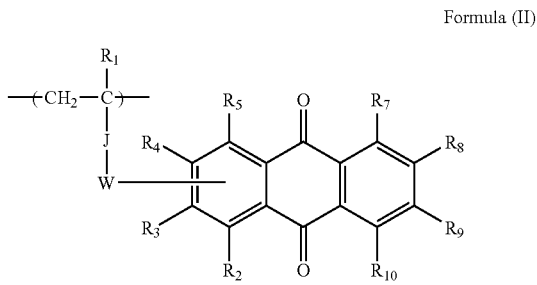

Formula (II)

wherein $R_7$ to $R_{10}$ each independently represent a hydrogen atom or a substituent; $R_1$ to $R_5$, J, and W in formula (II) have the same meanings as $R_1$ to $R_5$, J, and W in formula (I), respectively.

5. The dispersion of a water-insoluble colorant according to claim 1, wherein the unit represented by formula (I) is a unit represented by formula (III):

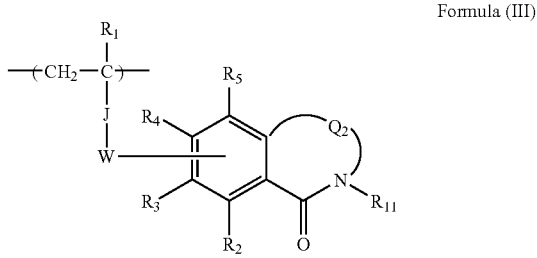

Formula (III)

wherein $Q_2$ represents a group of atoms necessary for forming, with the carbon atoms and the nitrogen atom, a ring; $R_{11}$ represents a hydrogen atom or a substituent; when $R_{11}$ represents a substituent, $R_{11}$ may further bind to any of the atoms constituting $Q_2$, to form a fused ring; $R_1$ to $R_5$, J, and W in formula (III) have the same meanings as $R_1$ to $R_5$, J, and W in formula (I), respectively.

6. The dispersion of a water-insoluble colorant according to claim 5, wherein the unit represented by formula (III) is a unit represented by formula (IV) or (V):

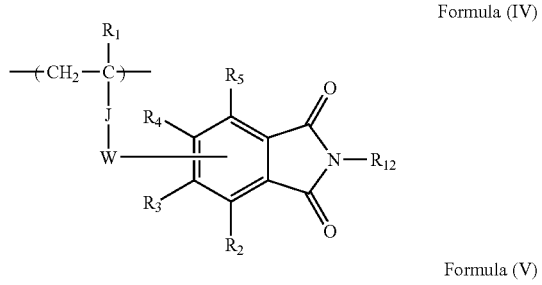

Formula (IV)

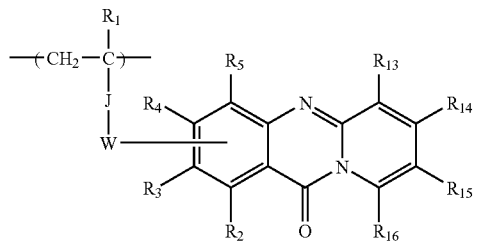

Formula (V)

wherein $R_{12}$, $R_{13}$, $R_{14}$, $R_{15}$, and $R_{16}$ each independently represents a hydrogen atom or a substituent; $R_1$ to $R_5$, J, and W in formula (IV) or (V) have the same meanings as $R_1$ to $R_5$, J, and W in formula (I), respectively.

7. The dispersion of a water-insoluble colorant according to claim 1, wherein the average particle diameter of the fine particles is 5 to 100 nm.

8. The dispersion of a water-insoluble colorant according to claim 1, wherein the water-insoluble colorant is an organic pigment selected from the group consisting of quinacridone organic pigments, diketopyrrolopyrrole organic pigments, mono azo yellow organic pigments, condensed azo organic pigments, quinophthalone organic pigments, benz-imidazolone organic pigments, and disazo yellow organic pigments.

9. A method of producing the water-insoluble colorant dispersion according to any one of claim 1, comprising the steps of:
dissolving the water-insoluble colorant, the polymer compound or surfactant, and a base, into an aprotic water-soluble organic solvent;
bringing the resultant solution into contact with an aqueous medium; and thus
forming the fine particles of the water-insoluble colorant dispersed in the water-containing medium.

10. The method of producing the water-insoluble colorant dispersion according to claim 9, further including the steps of: aggregating the fine particles into redispersible agglomerates, separating the agglomerates from the medium, and redispersing the agglomerates, to form fine particles redispersed in a redispersion medium.

11. The method of producing the water-insoluble colorant dispersion according to claim 9, further bringing the dispersion into a heat-treatment before or after the redispersion.

12. A recording liquid comprising the fine particles of the water-insoluble colorant according to claim 1, wherein the fine particles of the water-insoluble colorant is contained in an amount of 0.1 to 20% by mass with respect to a total mass of the recording liquid.

13. The recording liquid according to claim 12, wherein the recording liquid is an inkjet recording liquid.

14. The recording liquid according to claim 12, further comprising a compound represented by formula (VI):

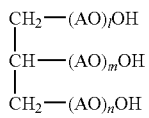

Formula (VI)

wherein l, m, and n each independently represent an integer of 1 or more, and l+m+n=3 to 15.

15. A printed article which contains fine particles of water-insoluble colorant, the printed article formed by the recording liquid as described in claim 12, using a provider, wherein the provider has a function to adjust an applied amount or concentration of the recording liquid, thereby light-to-dark contrast of the printed article is adjusted.

16. An image-forming method, which comprises the steps of:
providing a material, the recording liquid according to claim 12, and an image-forming apparatus; and
recording an image of the recording liquid on the material with the image-forming apparatus.

17. An image-forming apparatus, comprising:
a storage unit of the recording liquid according to claim 12; and
an image-forming unit;
whereby the recording liquid is recorded on a material with the image-forming unit.

18. The dispersion of a water-insoluble colorant according to claim 1, wherein a mass ratio of the polymer compound to the water-insoluble colorant (D/P ratio) is 0.01 to 2.0.

* * * * *